(12) United States Patent
Xie

(10) Patent No.: US 12,556,691 B2
(45) Date of Patent: Feb. 17, 2026

(54) INTRA PREDICTION METHOD AND DECODER

(71) Applicant: GUANGDONG OPPO MOBILE TELECOMMUNICATIONS CORP., LTD., Guangdong (CN)

(72) Inventor: Zhihuang Xie, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 18/753,956

(22) Filed: Jun. 25, 2024

(65) Prior Publication Data

US 2024/0357092 A1 Oct. 24, 2024

Related U.S. Application Data

(63) Continuation of application No. PCT/CN2021/142114, filed on Dec. 28, 2021.

(51) Int. Cl.
*H04N 19/11* (2014.01)
*H04N 19/176* (2014.01)

(52) U.S. Cl.
CPC ........... *H04N 19/11* (2014.11); *H04N 19/176* (2014.11)

(58) Field of Classification Search
CPC .............................. H04N 19/11; H04N 19/176
USPC ..................................................... 375/240.02
See application file for complete search history.

(56) References Cited

U.S. PATENT DOCUMENTS

2020/0221084 A1 7/2020 Jang et al.
2022/0417501 A1* 12/2022 Yang .................... H04N 19/593

FOREIGN PATENT DOCUMENTS

| CN | 110741643 | 1/2020 |
|----|-----------|--------|
| CN | 112514378 | 3/2021 |
| CN | 113691809 | 11/2021 |
| EP | 3709644 | 9/2020 |

OTHER PUBLICATIONS

WIPO, International Search Report and Written Opinion for International Application No. PCT/CN2021/142114, Jun. 29, 2022.
Li et al., "EE2-related: Implicit derivation of DIMD blend modes," Joint Video Experts Team (JVET) of ITU-T SG 16 WP 3 and ISO/IEC JTC 1/SC 29, Document: JVET-W0067-v1, Jul. 2021.
Zhou et al., "EE2-related: Optimization on the second mode derivation of DIMD blending mode," Joint Video Experts Team (JVET) of ITU-T SG 16 WP 3 and ISO/IEC JTC 1/SC 29, Document: JVET-X0115-v1, Oct. 2021.

(Continued)

*Primary Examiner* — Nguyen T Truong
(74) *Attorney, Agent, or Firm* — Hodgson Russ LLP

(57) ABSTRACT

An intra prediction method includes the following. A first intra prediction mode and a second intra prediction mode for the current block are determined according to amplitude values of N intra prediction modes. A weighted blending condition for the current block is determined according to an amplitude value of the first intra prediction mode and an amplitude value of the second intra prediction mode. A target prediction value of the current block is determined according to the weighted blending condition and at least one of the first intra prediction mode, the second intra prediction mode, or a third intra prediction mode.

20 Claims, 12 Drawing Sheets

(56) References Cited

OTHER PUBLICATIONS

Abdoli et al., "Non-CE3: Decoder-side Intra Mode Derivation with Prediction Fusion Using Planar," Joint Video Experts Team (JVET) of ITU-T SG 16 WP 3 and ISO/IEC JTC 1/SC 29/WG 11, Document: JVET-O0449-v2, Jul. 2019.
Abdoli et al., "Decoder-side Intra Mode Derivation For Next Generation Video Coding," 2020 IEEE International Conference On Multimedia and Expo (ICME), Jul. 2020.
Xie et al., "AHG 12: On signalling of intra template matching," Joint Video Experts Team (JVET) of ITU-T SG 16 WP 3 and ISO/IEC JTC 1/SC 29, Document: JVET-X0124-v1, Oct. 2021.
EPO, Extended European Search Report for EP Application No. 21969348.8, Sep. 23, 2025.

\* cited by examiner

INTRA PREDICTION METHOD AND DECODER

CROSS-REFERENCE TO RELATED APPLICATION(S)

This application is a continuation of International Application No. PCT/CN2021/142114, filed Dec. 28, 2021, the entire disclosure of which is incorporated herein by reference.

TECHNICAL FIELD

This disclosure relates to the technical field of video coding, and in particular to an intra prediction method and a decoder.

BACKGROUND

Digital video technology may be incorporated into multiple video apparatuses such as a digital television, a smart mobile phone, a computer, an e-reader, or a video player, etc. With the development of video technology, video data includes an enormous amount of data. To facilitate video data transmission, a video apparatus implements a video compression technology to enable more effective transmission or storage of the video data.

Compression of the video is realized through encoding, where the encoding process includes prediction, transformation, and quantization, etc. For example, a prediction block of a current block is determined by intra prediction and/or inter prediction, the prediction block is subtracted from the current block to obtain a residual block, the residual block is transformed to obtain transform coefficients, and the transform coefficients are quantized to obtain quantization coefficients that are then encoded to form a bitstream.

In order to improve accuracy of intra prediction, weighted blending prediction may be performed on the current block by using two or more intra prediction modes, so as to obtain a prediction value of the current block. In some cases, the weighted blending prediction can improve the prediction effect. However, in some cases, the weighted blending prediction may reduce the prediction quality. Therefore, before the weighted blending, it is necessary to determine whether to perform the weighted blending based on a weighted blending condition. As can be seen, the setting of the weighted blending condition directly influences the accuracy of intra prediction.

SUMMARY

In a first aspect, an intra prediction method is provided in the present disclosure. The method includes the following. A bitstream is decoded to determine amplitude values of N intra prediction modes corresponding to a reconstructed region adjacent to a current block, and a first intra prediction mode and a second intra prediction mode for the current block are determined according to the amplitude values of the N intra prediction modes, where N is an integer greater than 1. A weighted blending condition for the current block is determined according to an amplitude value of the first intra prediction mode and an amplitude value of the second intra prediction mode, where the weighted blending condition is used to determine whether weighted prediction is performed on the current block based on the first intra prediction mode, the second intra prediction mode, and a third intra prediction mode. A target prediction value of the current block is determined according to the weighted blending condition and at least one of the first intra prediction mode, the second intra prediction mode, or a third intra prediction mode In a second aspect, an intra prediction method is provided in the present disclosure. The method includes the following. Amplitude values of N intra prediction modes corresponding to a reconstructed region adjacent to a current block are determined, and a first intra prediction mode and a second intra prediction mode for the current block are determined according to the amplitude values of the N intra prediction modes, where N is an integer greater than 1. A weighted blending condition for the current block is determined according to an amplitude value of the first intra prediction mode and an amplitude value of the second intra prediction mode, where the weighted blending condition is used to determine whether weighted prediction is performed on the current block based on the first intra prediction mode, the second intra prediction mode, and a third intra prediction mode. An intermediate prediction value of the current block is determined according to the weighted blending condition and at least one of the first intra prediction mode, the second intra prediction mode, or a third intra prediction mode. A target prediction value of the current block is determined according to the intermediate prediction value of the current block.

In a third aspect, a video decoder is provided. The video decoder includes a processor and a memory for storing a computer program. The processor is configured to invoke and run the computer program stored in the memory to perform the method of the first aspect or implementations thereof.

DETAILED DESCRIPTION

The disclosure can be applied to the fields of picture coding, video coding, hardware video coding, dedicated circuit video coding, real-time video coding, etc. For example, the solution in the disclosure may be incorporated into audio video coding standards (AVS), such as H.264/ audio video coding (AVC) standard, H.265/high efficiency video coding (HEVC) standard, and H.266/versatile video coding (VVC) standard. Alternatively, the solution in the disclosure may incorporated into other proprietary or industry standards, including ITU-TH.261, ISO/IECMPEG-1 Visual, ITU-TH.262 or ISO/IECMPEG-2Visual, ITU-TH.263, ISO/IECMPEG-4Visual, ITU-TH.264 (also known as ISO/IECMPEG-4AVC), including scalable video coding (SVC) and multi-view video coding (MVC) extensions. It may be understood that the techniques in the disclosure are not limited to any particular coding standard or technology.

Figure 1:
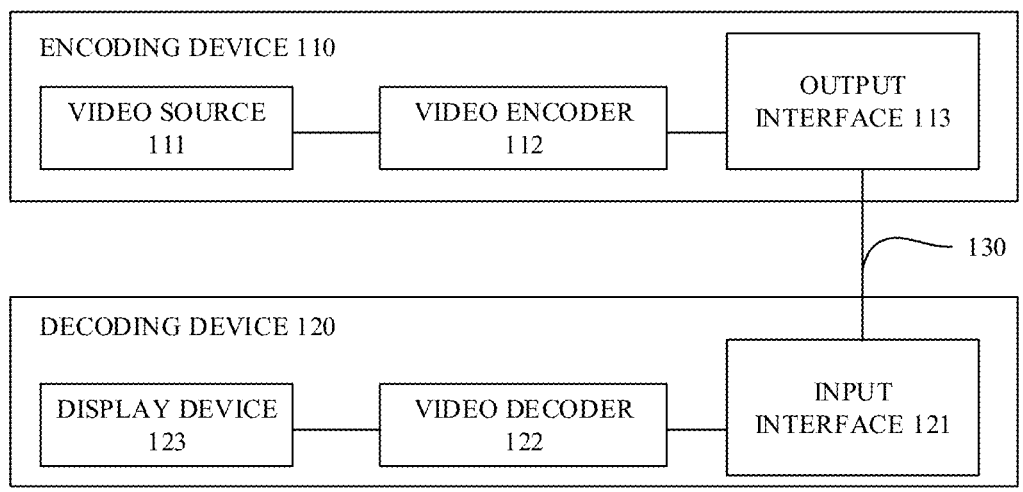
FIG. 1 is a schematic block diagram of a video coding system in embodiments of the present disclosure.

For ease of understanding, a video coding system in embodiments of the present disclosure is first introduced with reference to FIG. 1.

FIG. 1 is a schematic block diagram of a video coding system in embodiments of the present disclosure. It may be noted that FIG. 1 is only an example, and the video coding system in embodiments of the present disclosure includes but is not limited to what is illustrated in FIG. 1. As illustrated in FIG. 1, the video coding system 100 includes an encoding device 110 and a decoding device 120. The encoding device is configured to encode (which can be understood as compress) video data to generate a bitstream, and transmit the bitstream to the decoding device. The decoding device decodes the bitstream generated by the encoding device to obtain decoded video data.

The encoding device 110 in the embodiments of the present disclosure can be understood as a device having a video encoding function, and the decoding device 120 can be understood as a device having a video decoding function, that is, the encoding device 110 and the decoding device 120 in the embodiments of the present disclosure include a wider range of devices, including smartphones, desktop computers, mobile computing devices, notebook (such as laptop) computers, tablet computers, set-top boxes, televisions, cameras, display devices, digital media players, video game consoles, vehicle-mounted computers, and the like.

In some embodiments, the encoding device 110 may transmit encoded video data (such as bitstream) to the decoding device 120 via a channel 130. The channel 130 may include one or more media and/or apparatuses capable of transmitting the encoded video data from the encoding device 110 to the decoding device 120.

In an example, the channel 130 includes one or more communication media that enable the encoding device 110 to transmit the encoded video data directly to the decoding device 120 in real-time. In this example, the encoding device 110 may modulate the encoded video data according to a communication standard and transmit the modulated video data to the decoding device 120. The communication medium includes a wireless communication medium, such as a radio frequency spectrum. Optionally, the communication medium may also include a wired communication medium, such as one or more physical transmission lines.

In another example, the channel 130 includes a storage medium that can store video data encoded by the encoding device 110. The storage medium includes a variety of local access data storage media, such as optical discs, DVDs, flash memory, and the like. In this example, the decoding device 120 may obtain encoded video data from the storage medium.

In another example, the channel 130 may include a storage server that may store video data encoded by the encoding device 110. In this example, the decoding device 120 may download the stored encoded video data from the storage server. Optionally, the storage server may store the encoded video data and may transmit the encoded video data to the decoding device 120. For example, the storage server may be a web server (e.g., for a website), a file transfer protocol (FTP) server, and the like.

In some embodiments, the encoding device 110 includes a video encoder 112 and an output interface 113. The output interface 113 may include a modulator/demodulator (modem) and/or a transmitter.

In some embodiments, the encoding device 110 may include a video source 111 in addition to the video encoder 112 and the output interface 113.

The video source 111 may include at least one of a video capture apparatus (for example, a video camera), a video archive, a video input interface, or a computer graphics system, where the video input interface is configured to receive video data from a video content provider, and the computer graphics system is configured to generate video data.

The video encoder 112 encodes the video data from the video source 111 to generate a bitstream. The video data may include one or more pictures or a sequence of pictures. The bitstream contains encoding information of a picture or a sequence of pictures. The encoding information may include encoded picture data and associated data. The associated data may include a sequence parameter set (SPS), a picture parameter set (PPS), and other syntax structures. The SPS may contain parameters applied to one or more sequences. The PPS may contain parameters applied to one or more pictures. The syntax structure refers to a set of zero or multiple syntax elements arranged in a specified order in the bitstream.

The video encoder 112 directly transmits the encoded video data to the decoding device 120 via the output interface 113. The encoded video data may also be stored on a storage medium or a storage server for subsequent reading by the decoding device 120.

In some embodiments, the decoding device 120 includes an input interface 121 and a video decoder 122.

In some embodiments, the decoding device 120 may include a display device 123 in addition to the input interface 121 and the video decoder 122.

The input interface 121 includes a receiver and/or a modem. The input interface 121 may receive encoded video data through the channel 130.

The video decoder 122 is configured to decode the encoded video data to obtain decoded video data, and transmit the decoded video data to the display device 123.

The display device 123 displays the decoded video data. The display device 123 may be integrated with the decoding device 120 or external to the decoding device 120. The display device 123 may include various display devices, such as a liquid crystal display (LCD), a plasma display, an organic light emitting diode (OLED) display, or other types of display devices.

In addition, FIG. 1 is only an example, and the technical solutions of the embodiments of the present disclosure are not limited to FIG. 1. For example, the technology of the present disclosure may also be applied to one-sided video encoding or one-sided video decoding.

A video encoding framework in embodiments of the present disclosure will be introduced below.

Figure 2:
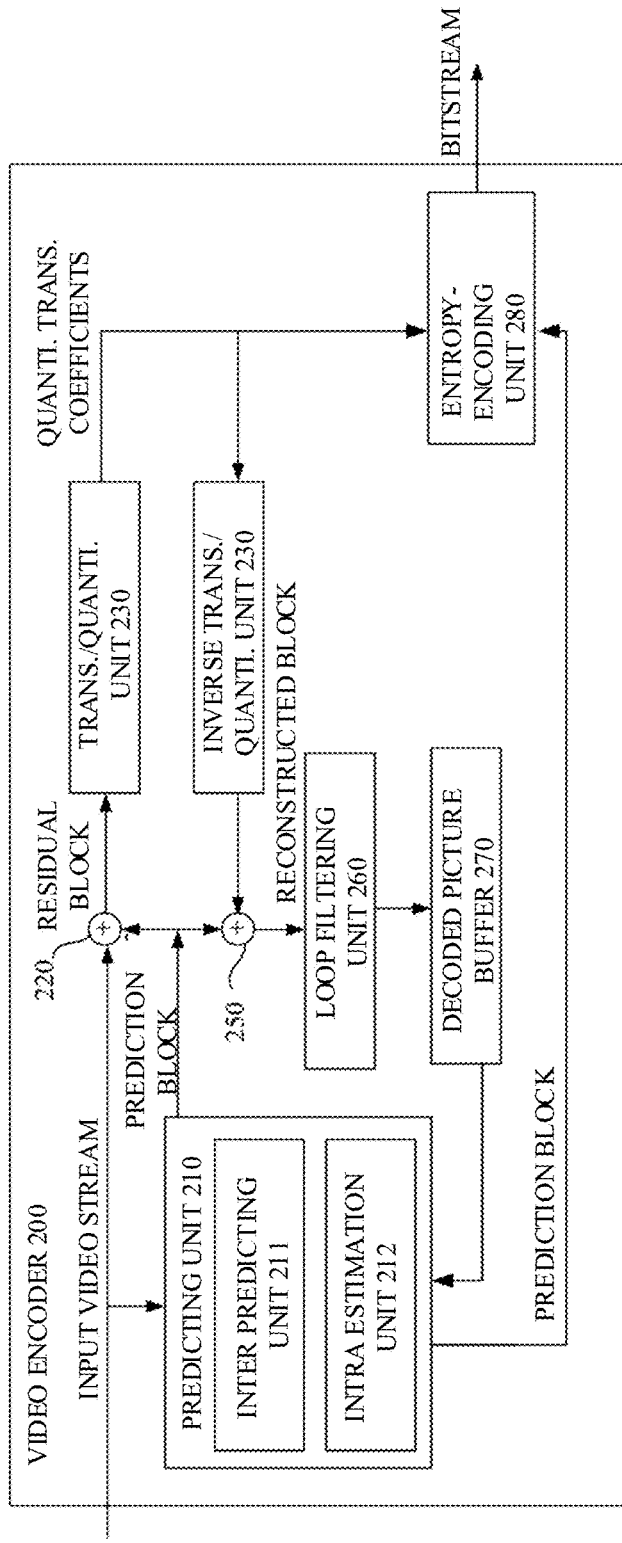
FIG. 2 is a schematic block diagram of a video encoder in embodiments of the present disclosure.

FIG. 2 is a schematic block diagram of a video encoder in embodiments of the present disclosure. It may be understood that the video encoder 200 may be configured to perform lossy compression or lossless compression on a picture. The lossless compression may be visually lossless compression or mathematically lossless compression.

The video encoder 200 may be applied to picture data in luma-chroma (YCbCr, YUV) format. For example, a YUV ratio can be 4:2:0, 4:2:2, or 4:4:4, where Y represents luminance (Luma), Cb (U) represents blue chrominance, and Cr (V) represents red chrominance. U and V represent chrominance (Chroma) for describing colour and saturation. For example, in terms of colour format, 4:2:0 represents that every 4 pixels have 4 luma components and 2 chroma components (YYYYCbCr), 4:2:2 represents that every 4 pixels have 4 luma components and 4 chroma components (YYYYCbCrCbCr), and 4:4:4 represents full pixel display (YYYYCbCrCbCrCbCrCbCr).

For example, the video encoder 200 reads video data, and for each picture in the video data, divides the picture into several coding tree units (CTU). In some examples, the CTU may be called "tree block", "largest coding unit" (LCU), or "coding tree block" (CTB). Each CTU may be associated with a sample block of the same size as the CTU within the picture. Each sample may correspond to one luminance (luma) sample and two chrominance (chroma) samples. Thus, each CTU may be associated with one luma sample block and two chroma sample blocks. The CTU may have a size of 128×128, 64×64, 32×32, and so on. The CTU may be further divided into several coding units (CUs) for coding. The CU may be a rectangular block or a square block. The CU may be further divided into a prediction unit (PU) and a transform unit (TU), so that coding, prediction, and transformation are separated, and thus processing is more flexible. In an example, the CTU is divided into CUs in a quadtree manner, and the CU is divided into TUs and PUs in a quadtree manner.

The video encoder and the video decoder can support various PU sizes. Assuming that a size of a specific CU is 2N×2N, video encoders and video decoders may support PUs of 2N×2N or N×N for intra prediction, and support symmetric PUs of 2N×2N, 2N×N, N×2N, N×N, or similar size for inter prediction. The video encoder and video decoder may also support asymmetric PUs of 2N×nU, 2N×nD, nL×2N, or nR×2N for inter prediction.

In some embodiments, as illustrated in FIG. 2, the video encoder 200 may include a predicting unit 210, a residual unit 220, a transform/quantization unit 230, an inverse transform/quantization unit 240, a reconstruction unit 250, a loop filtering unit 260, a decoded picture buffer 270, and an entropy-encoding unit 280. It may be noted that the video encoder 200 may include more, less, or different functional components.

Optionally, in this disclosure, a current block may be referred to as a current CU or a current PU. A prediction block may be referred to as a predicted picture block or a picture prediction block, and a reconstructed picture block may be referred to as a reconstructed block or a picture reconstructed block.

In some embodiments, the predicting unit 210 includes an inter predicting unit 211 and an intra estimation unit 212. Since there is a strong correlation between adjacent samples in a video picture, intra prediction is used in the video coding technology to eliminate spatial redundancy between adjacent samples. Since there is a strong similarity between adjacent pictures in video, inter prediction is used in the video coding technology to eliminate temporal redundancy between adjacent pictures, thereby improving encoding efficiency.

The inter predicting unit 211 may be used for inter prediction. The inter prediction can refer to picture information of different pictures. In inter prediction, motion information is used to find a reference block from a reference picture, and a prediction block is generated according to the reference block to eliminate temporal redundancy. A picture for which inter prediction is used may be a P frame and/or a B frame, where P frame refers to a forward predicted picture, and B frame refers to a bidirectional predicted picture. The motion information includes a reference picture list containing the reference picture, a reference picture index, and a motion vector. The motion vector can be a full-pixel motion vector or a sub-pixel motion vector. If the motion vector is the sub-pixel motion vector, interpolation filtering on the reference picture is required to generate a required sub-pixel block. Here, a block of full-pixels or sub-pixels found in the reference picture according to the motion vector is called a reference block. In some technologies, the reference block may be called a prediction block, and in some technologies the prediction block will be generated based on the reference block. Generating the prediction block based on the reference block may also be understood as taking the reference block as a prediction block and then processing and generating a new prediction block based on the prediction block.

The intra estimation unit 212 predicts sample information of the current picture block by only referring to information of the same picture, so as to eliminate spatial redundancy. A frame for which intra prediction is used may be an I frame. For example, for a 4×4 current block, samples in the left column and the top row of the current block are used as reference samples for intra prediction of the current block. These reference samples may all be available, i.e., they have all been coded. Alternatively, some of these reference samples may not be available. For example, if the current block is on the leftmost of the picture, reference samples on the left of the current block are not available. For another example, during coding the current block, if samples on the bottom left of the current block have not yet been coded, the reference samples on the bottom left are also not available. The reference samples that are not available may be filled with available reference samples or certain values, or by using certain methods, or no filling may be performed.

Figure 4:
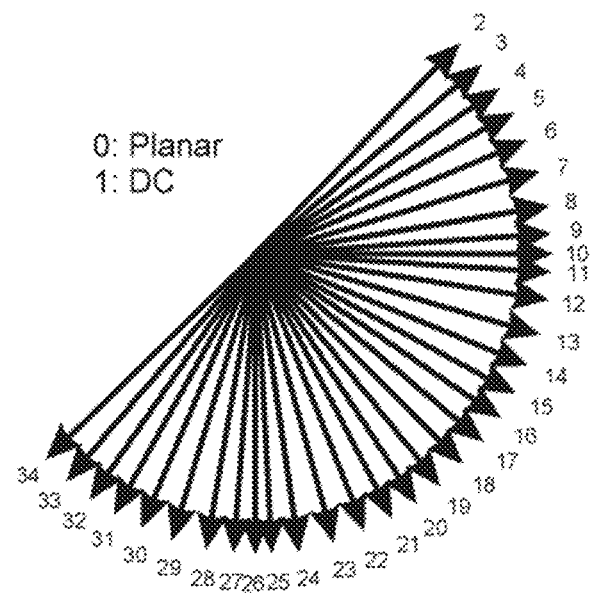
FIG. 4 is a schematic diagram of intra prediction modes.
Figure 5:
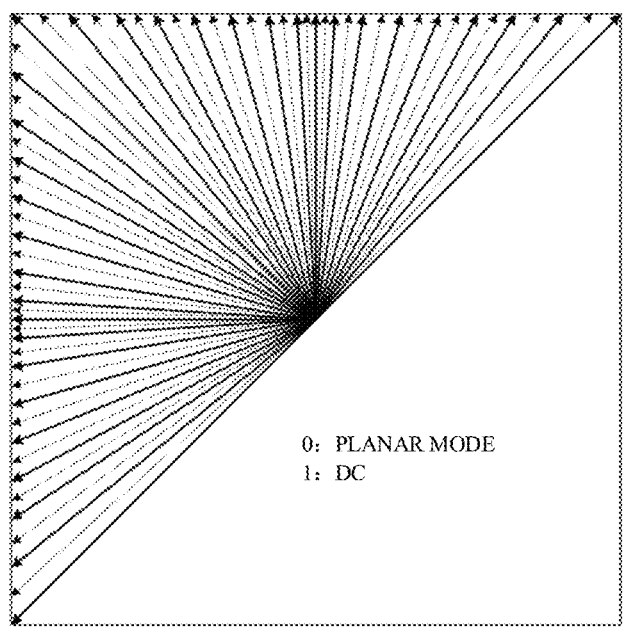
FIG. 5 is a schematic diagram of intra prediction modes.
Figure 6:
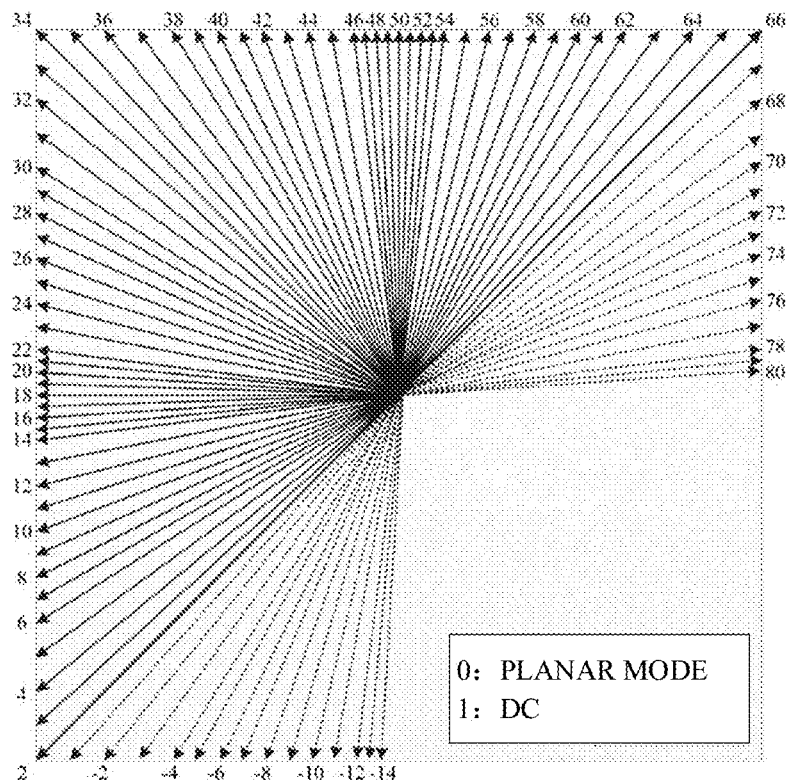
FIG. 6 is a schematic diagram of intra prediction modes.

There are multiple prediction modes for intra prediction. For example, FIG. 4 is a schematic diagram of intra prediction modes. As illustrated in FIG. 4, intra prediction modes used in HEVC include a Planar mode, a DC mode, and 33 angular modes, with a total of 35 prediction modes. FIG. 5 is a schematic diagram of intra prediction modes. As illustrated in FIG. 5, intra modes used in VVC include a Planar mode, a DC mode, and 65 angular modes, with a total of 67 prediction modes. FIG. 6 is a schematic diagram of intra prediction modes. As illustrated in FIG. 6, AVS3 uses a total of 66 prediction modes, including a DC mode, a Planar mode, a Bilinear mode, and 63 angular modes.

It may be noted that with the increase in the number of angular modes, the intra prediction will be more accurate, which will be more in line with the demand for the development of high-definition and ultra-high-definition digital video.

The residual unit 220 may generate a residual block of the CU based on a sample block of the CU and a prediction block of a PU of the CU. For example, the residual unit 220 may generate the residual block for the CU such that each sample in the residual block has a value equal to a difference between a sample in the sample block of the CU and a corresponding sample in the prediction block of the PU of the CU.

The transform/quantization unit 230 may quantize transform coefficients. The transform/quantization unit 230 may quantize transform coefficients associated with a TU of a CU based on a quantization parameter (QP) value associated with the CU. The video encoder 200 may adjust the degree of quantization applied to transform coefficients associated with the CU by adjusting the QP value associated with the CU.

The inverse transform/quantization unit 240 may perform inverse quantization and inverse transform respectively on the quantized transform coefficients to reconstruct a residual block from the quantized transform coefficients.

The reconstruction unit 250 may add samples in the reconstructed residual block with corresponding samples in one or more prediction blocks generated by the predicting unit 210 to generate a reconstructed picture block associated with the TU. By reconstructing sample blocks of each TU of the CU in this way, the video encoder 200 can reconstruct the sample block of the CU.

The loop filtering unit 260 may perform deblocking filtering to reduce blocking artifacts of the sample block associated with the CU.

In some embodiments, the loop filtering unit 260 includes a deblocking filtering unit and a sample adaptive offset/adaptive loop filtering (SAO/ALF) unit, where the deblocking filtering unit is configured for deblocking, and the SAO/ALF unit is configured to remove a ringing effect.

The decoded picture buffer 270 may buffer reconstructed sample blocks. The inter predicting unit 211 may use reference pictures containing reconstructed sample blocks to perform inter prediction on PUs of other pictures. In addition, the intra estimation unit 212 may use the reconstructed sample blocks in the decoded picture buffer 270 to perform intra prediction on other PUs in the same picture as the CU.

The entropy-encoding unit 280 may receive the quantized transform coefficients from the transform/quantization unit 230. The entropy-encoding unit 280 may perform one or more entropy-encoding operations on the quantized transform coefficients to generate entropy-encoded data.

Figure 3:
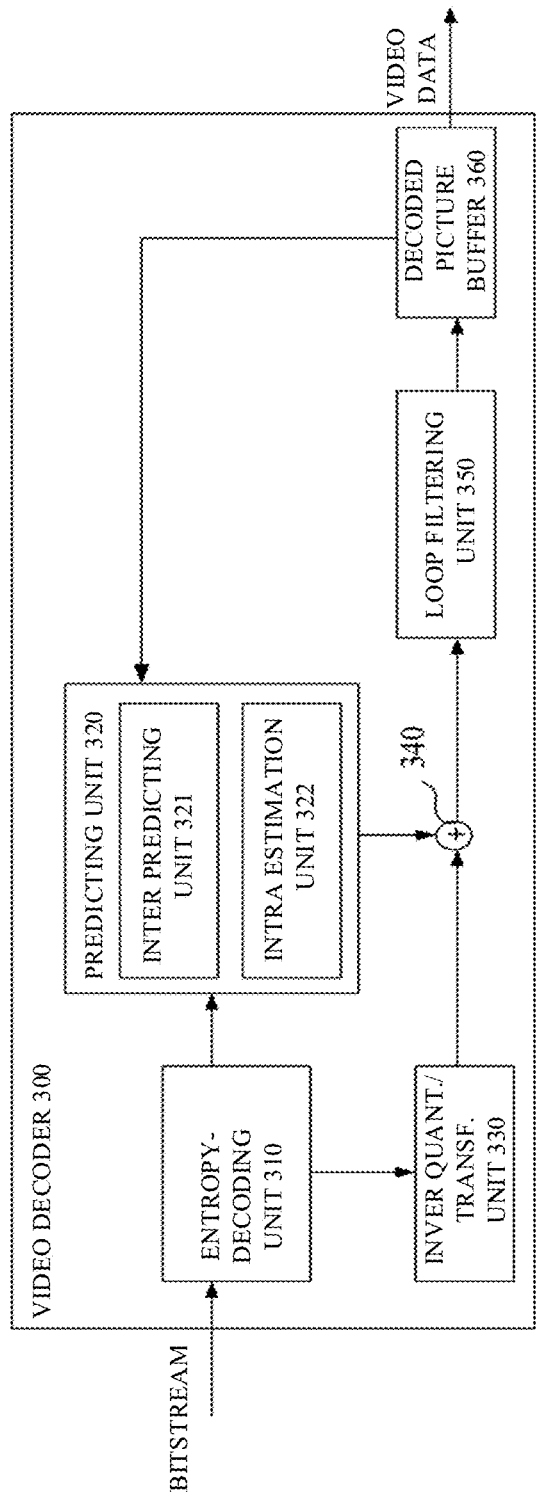
FIG. 3 is a schematic block diagram of a video decoder in embodiments of the present disclosure.

FIG. 3 is a schematic block diagram of a video decoder in embodiments of the present disclosure.

As illustrated in FIG. 3, the video decoder 300 includes an entropy-decoding unit 310, a predicting unit 320, an inverse quantization/transform unit 330, a reconstruction unit 340, a loop filtering unit 350, and a decoded picture buffer 360. It may be noted that the video decoder 300 may include more, less, or different functional components.

The video decoder 300 may receive a bitstream. The entropy-decoding unit 310 may parse the bitstream to extract syntax elements from the bitstream. As part of parsing the bitstream, the entropy-decoding unit 310 may parse entropy-encoded syntax elements in the bitstream. The predicting unit 320, the inverse quantization/transform unit 330, the reconstruction unit 340, and the loop filtering unit 350 may decode video data according to the syntax elements extracted from the bitstream, that is, generate decoded video data.

In some embodiments, the predicting unit 320 includes an inter predicting unit 321 and an intra estimation unit 322.

The intra estimation unit 322 (also referred to as the "intra predicting unit") may perform intra prediction to generate a prediction block of a PU. The intra estimation unit 322 may use an intra prediction mode to generate a prediction block of the PU based on a sample block of spatially neighbouring PUs. The intra estimation unit 322 may also determine an intra prediction mode for the PU according to one or more syntax elements parsed from the bitstream.

The inter predicting unit 321 can construct a first reference picture list (list 0) and a second reference picture list (list 1) according to the syntax elements parsed from the bitstream. Furthermore, the entropy-decoding unit 310 may parse motion information of the PU if the PU is encoded using inter prediction. The inter predicting unit 321 may determine one or more reference blocks for the PU according to the motion information of the PU. The inter predicting unit 321 may generate a prediction block for the PU based on one or more reference blocks of the PU.

The inverse quantization/transform unit 330 (also referred to as the "de-quantization/transform unit") may perform inverse quantization on (i.e., dequantize) transform coefficients associated with a TU. The inverse quantization/transform unit 330 may use a QP value associated with a CU of the TU to determine the degree of quantization.

After inverse quantization of the transform coefficients, the inverse quantization/transform unit 330 may perform one or more inverse transformations on the inverse-quantized transform coefficients in order to generate a residual block associated with the TU.

The reconstruction unit 340 uses the residual blocks associated with the TU of the CU and the prediction block of the PU of the CU to reconstruct a sample block of the CU. For example, the reconstruction unit 340 may add samples in the residual block with corresponding samples in the prediction block to reconstruct the sample block of the CU to obtain the reconstructed picture block.

The loop filtering unit 350 may perform deblocking filtering to reduce blocking artifacts of the sample block associated with the CU.

The video decoder 300 may store the reconstructed picture of the CU in the decoded picture buffer 360. The video decoder 300 may use the reconstructed picture in the decoded picture buffer 360 as a reference picture for subsequent prediction, or transmit the reconstructed picture to a display device for display.

As can be seen from FIG. 2 and FIG. 3, a basic process of video coding is as follows. At the encoding end, a picture (or frame) is divided into blocks, and for a current block, the predicting unit 210 performs intra prediction or inter prediction to generate a prediction block of the current block. The residual unit 220 may calculate a residual block based on the prediction block and the original block of the current block. For example, the prediction block is subtracted from the original block of the current block to obtain the residual block, where the residual block may also be referred to as residual information. The residual block can be transformed and quantized by the transform/quantization unit 230 to remove information that is not sensitive to human eyes, so as to eliminate visual redundancy. Optionally, the residual block before being transformed and quantized by the transform/quantization unit 230 may be called a time-domain residual block, and the time domain residual block after being transformed and quantized by the transform/quantization unit 230 may be called a frequency residual block or a frequency-domain residual block. The entropy-encoding unit 280 receives the quantized transformation coefficients output by the transform/quantization unit 230, and may perform entropy-encoding on the quantized transformation coefficients to output a bitstream. For example, the entropy-encoding unit 280 can eliminate character redundancy according to the target context model and probability information of the binary bitstream.

At the decoding end, the entropy-decoding unit 310 may parse the bitstream to obtain prediction information, a quantization coefficient matrix, etc. of the current block, and the predicting unit 320 performs intra prediction or inter prediction on the current block based on the prediction information to generate a prediction block of the current block. The inverse quantization/transform unit 330 uses the quantization coefficient matrix obtained from the bitstream to perform inverse quantization and inverse transformation on the quantization coefficient matrix to obtain a residual block. The reconstruction unit 340 adds the prediction block and the residual block to obtain a reconstructed block. The reconstructed blocks form a reconstructed picture. The loop filtering unit 350 performs loop filtering on the reconstructed picture on a picture basis or on a block basis to obtain a decoded picture. Similar operations for obtaining the decoded picture at the decoding end are also needed at the encoding end. The decoded picture may also be referred to as a reconstructed picture, and the reconstructed picture may be a reference picture of a subsequent picture for inter prediction.

It may be noted that block division information determined at the encoding end, as well as mode information or parameter information for prediction, transformation, quantization, entropy-encoding, and loop filtering, etc., are carried in the bitstream when necessary. The decoding end parses the bitstream and analyzes existing information to determine the block division information, as well as mode information or parameter information for prediction, transformation, quantization, entropy-encoding, loop filtering, etc. the same as such information at the encoding end, so as to ensure the decoded picture obtained by the encoding end is the same as the decoded picture obtained by the decoding end.

The current block may be the current CU or the current PU, etc.

The above is the basic process of the video encoder and the video decoder under a block-based hybrid coding framework. With the development of technology, some modules or steps of the framework or process may be optimized. This disclosure is applicable to the basic process of the video encoder and the video decoder under the block-based hybrid coding framework, but is not limited to the framework and process.

As can be seen from the above, during coding, in a general hybrid coding framework, prediction is first performed, which utilizes spatial or temporal correlation to obtain a picture that is the same or similar to the current block. It is possible for a block that the predicted block is identical to the current block, but it is difficult to guarantee that this is the case for all blocks in a video, especially in a natural video or a video captured by a camera, due to the presence of noise. In addition, it is hard to completely predict irregular movements, distortions, deformations, occlusions, variations in brightness, etc. in a video. Therefore, the hybrid coding framework subtracts the predicted picture from the original picture of the current block to obtain the residual image, or in other words, subtracts the predicted block from the current block to obtain the residual block. The residual block is usually much simpler than the original picture, and thus prediction can significantly improve compression efficiency. The residual block is usually transformed first, rather than being encoded directly. During the transformation, the residual image is transformed from the spatial domain to the frequency domain, to remove the correlation from the residual picture. After the residual picture is transformed to the frequency domain, the transformed non-zero coefficients are mostly concentrated in the upper-left corner since the energy is mostly concentrated in the low-frequency region. Next, quantization is utilized for further compression. Since the human eye is not sensitive to high frequencies, a larger quantization step may be used for the high-frequency region.

JVET, the international video coding standard development organization, has set up a group to research beyond the H.266/VVC coding model and named the model, i.e., the platform test software, as Enhanced Compression Model (ECM). ECM has started to adopt newer and more efficient compression algorithms based on VTM10.0, and has surpassed VVC in terms of coding performance by about 13% at present. ECM not only expands the size of the coding unit for a given resolution, but also integrates many intra prediction and inter prediction technologies. The present disclosure mainly relates to the intra prediction technology.

ECM is a reference software for tools as well as tool combinations to further improve the performance of VVC. ECM is based on VTM-10.0 and integrates EE-adopted tools and technologies.

In the intra coding of ECM, similar to VTM (a reference software test platform for VVC), there are traditional processes such as intra prediction and transformation of residuals. Different from VVC, two technologies are adopted to derive an intra prediction mode in the intra prediction process, namely Decoder-side Intra Mode Derivation (DIMD) and Template-based Intra Mode Derivation (TIMD).

The DIMD and TIMD technologies allow the derivation of intra prediction modes at the decoding side, thus avoiding encoding of indexes of the intra prediction modes, so as to achieve codeword savings.

The process of implementing the DIMD technology includes the following two main steps.

Figure 7A:
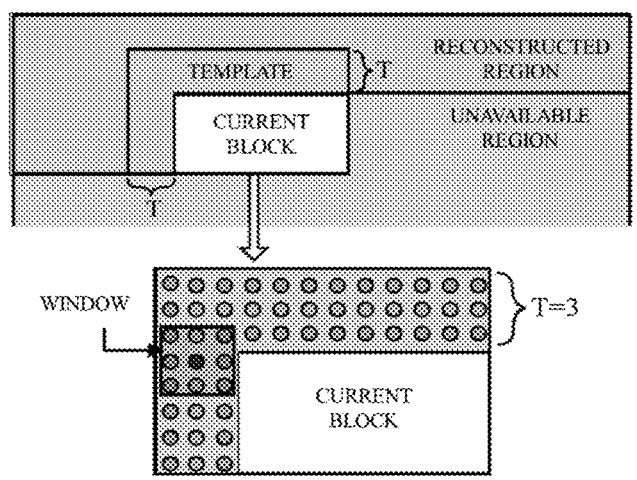
FIG. 7A is a schematic diagram of a template under decoder-side intra mode derivation (DIMD).
Figure 7B:
FIG. 7B is a histogram of amplitude values and angular modes.

In the first step, the intra prediction mode is derived. The same method for calculating prediction mode intensity is used at both the encoding end and the decoding end. As illustrated in FIG. 7A, the DIMD uses reconstructed samples neighbouring to the current block as a template, scans each 3×3 region on the template and calculates gradients in the horizontal and vertical directions respectively with a sobel operator, and finds the gradient Dx and Dy according to the horizontal and vertical directions. Then according to Dx and Dy, an amplitude value at each position can be found: amp=Dx+Dy, and an angle value at each position can be found: angular=arctan (Dy/Dx). The angle at each position on the template corresponds to a conventional angular prediction mode, and amplitude values for the same angular mode are accumulated to obtain the histogram of amplitude values versus angular modes illustrated in FIG. 7B. A prediction mode with the greatest amplitude value in the histogram illustrated in FIG. 7B is determined as a first intra prediction mode, and a prediction mode with the second-greatest amplitude value is determined as a second intra prediction mode.

In the second step, a prediction block is derived. The same process for deriving the prediction block is used at both the encoding end and the decoding end to obtain the current prediction block. Taking ECM2.0 as an example, the encoding end considers the following two conditions.

Condition 1, the gradient of the second prediction mode is not zero.

Condition 2, neither the first prediction mode nor the second prediction mode is a Planar mode or a DC prediction mode.

Figure 7C:
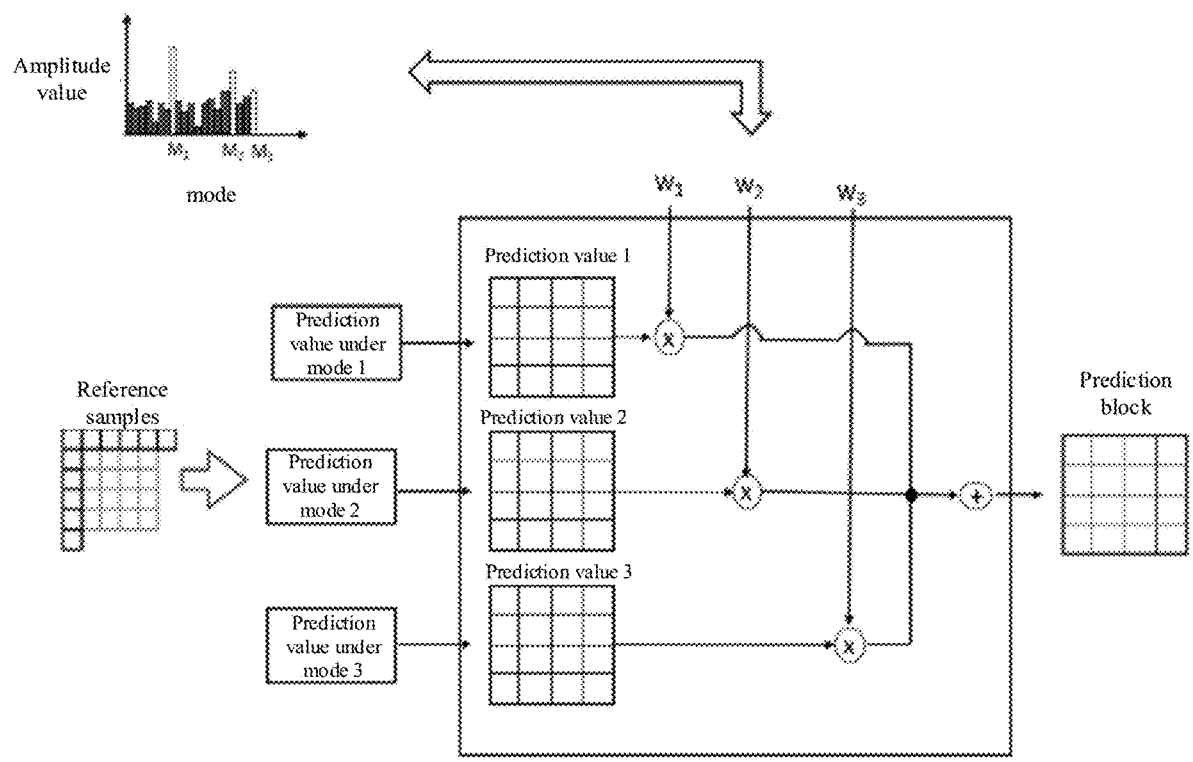
FIG. 7C is a schematic diagram illustrating prediction under DIMD.

If the above two conditions do not both hold, then only the first intra prediction mode is used to calculate prediction sample values for the current block. Otherwise, i.e., both of the above two conditions hold, the weighted averaging method is used for deriving the current prediction block. Specifically, prediction values under the first intra prediction mode, the second intra prediction mode, and the Planar mode respectively may be weighted to obtain a final prediction result under the DIMD. The specific process is illustrated in FIG. 7C. Exemplarily, the process of weighting calculation is shown in equations (1) and (2):

$$w0 = \frac{1}{3}, w1 = \frac{2}{3} \times \frac{amp1}{amp1 + amp2}, w2 = \frac{2}{3} \times \frac{amp2}{amp1 + amp2} \quad (1)$$

$$Pred = Pred_{planar} \times w0 + Pred_{mode1} \times w1 + Pred_{mode2} \times w2 \quad (2)$$

In the above, w0, w1, and w2 are weights assigned to the Planar mode, the first intra prediction mode, and the second intra prediction mode, respectively, $Pred_{planar}$ is the prediction value corresponding to the Planar mode, $Pred_{mode1}$ is the prediction value corresponding to the first intra prediction mode, $Pred_{mode2}$ is the prediction value corresponding to the second intra prediction mode, Pred is a weighted prediction value corresponding to DIMD, amp1 is an amplitude value corresponding to the first intra prediction mode, and amp2 is an amplitude value corresponding to the second intra prediction mode.

In some embodiments, DIMD requires transmission of a flag to the decoding end to indicate whether the DIMD technology is used for the current coding unit.

As can be seen from the above, the prediction mode derivation of the DIMD technology is able to alleviate a certain transmission burden of syntactic elements, so that overhead of the prediction mode can be saved from original at least 5 bits to 1 bit. Moreover, after obtaining the prediction mode information, DIMD blends the prediction blocks corresponding to the optimal prediction mode, the suboptimal prediction mode, and the Planar mode through a blending operation to produce a new prediction block. The new prediction block is neither predicted by any of the aforementioned prediction modes, nor a same prediction block that can be obtained by any subsequent prediction tool. Through experimental comparisons, it can be found that this blending technology indeed improves the prediction efficiency.

However, the prediction value obtained by weighted blending is applicable to video contents in natural scenes, but is not applicable to video contents in specific scenes. Objects in the former video contents often have relatively fuzzy edges and include some noise caused by shooting, and prediction values that better matches with these objects can be obtained using the TIMD blending. Objects in the latter video contents are often characterized by sharpness and colour vividness, and these video contents are often computer-recorded or referred to as screen content videos. In such contents, prediction values generated in the TIMD blending are redundant, which reduces the prediction quality and even brings noise. In other words, in some cases, the use of weighted blending prediction can improve the prediction effect, but in some cases, the use of weighted blending prediction may rather reduce the prediction quality. Therefore, before weighted blending is performed, it is necessary to determine whether or not to perform the weighted blending based on the weighted blending condition. It can be seen that the setting of weighted blending conditions directly affects the accuracy of intra prediction. However, currently the weighted blending conditions are too broad, such that weighted blending may be performed on image contents that do not require weighted blending, resulting in poor prediction quality.

In order to solve the above technical problems, the present disclosure determines a weighted blending condition for the current block based on the amplitude values of the first intra prediction mode and the second intra prediction mode, and determines whether to perform weighted blending prediction for the current block based on the determined weighted blending condition. In this way, the problem of lowering the prediction quality and introducing unexpected noise when performing weighted blending prediction of image contents that do not need weighted blending prediction, can be avoided, and thus the accuracy of intra prediction can be improved.

It may be noted that the intra prediction method provided in embodiments of the present disclosure, in addition to being applied to the above DIMD technology, can be applied to any scene where two or more intra prediction modes are allowed for weighted blending prediction.

The video coding methods provided in embodiments of the present disclosure are described below in connection with specific embodiments.

Figure 8:
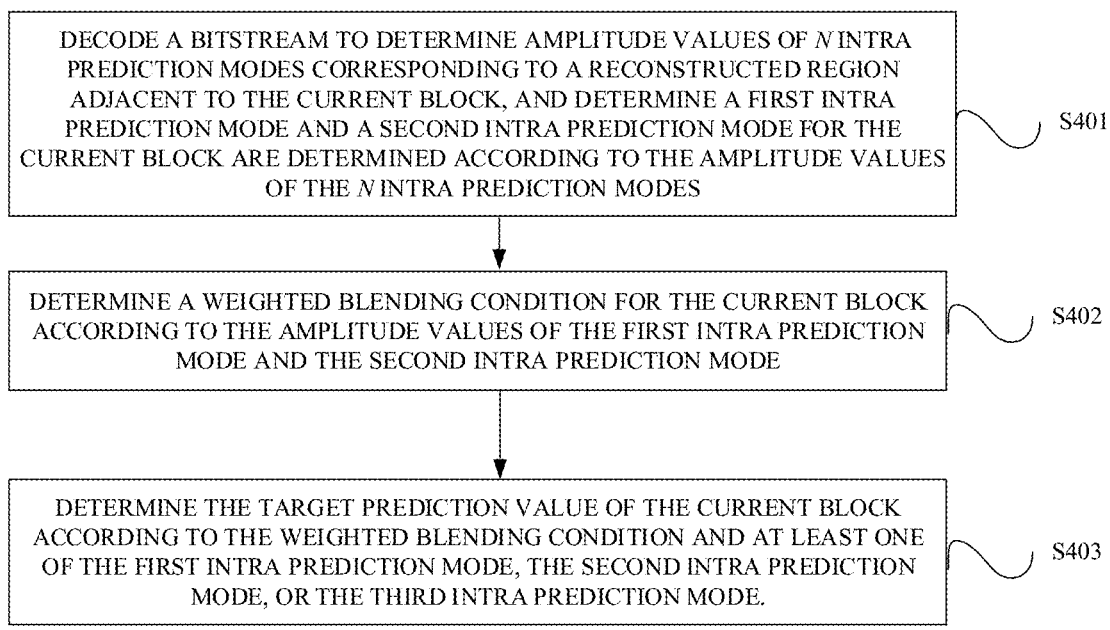
FIG. 8 is a schematic flowchart of an intra prediction method provided in embodiments of the present disclosure.

Taking a decoding end as an example, a video decoding method provided in embodiments of the present disclosure is first introduced with reference to FIG. 8.

FIG. 8 is a schematic flowchart of an intra prediction method provided in embodiments of the present disclosure. Embodiments of the present disclosure are applicable to the video decoder as illustrated in FIG. 1 and FIG. 3. As illustrated in FIG. 8, the method in embodiments of the present disclosure includes the following.

S401, a bitstream is decoded to determine amplitude values of N intra prediction modes corresponding to a reconstructed region adjacent to a current block, and a first intra prediction mode and a second intra prediction mode for the current block are determined according to the amplitude values of the N intra prediction modes, where N is a positive integer greater than 1.

In some embodiments, the current block may also be referred to as a current decoding block, a current decoding unit, a decoding block, a current block to-be-decoded, etc.

In some embodiments, for the current block that includes a chroma component and does not include a luma component, the current block may be referred to as a chroma block.

In some embodiments, for the current block that includes the luma component and does not include the chroma component, the current block may be referred to as a luma block.

It is to be noted that, when the video decoder determines that weighted blending prediction with multiple intra prediction modes (such as DIMD technology) are allowed for the current block, the video decoder determines the first intra prediction mode and the second intra prediction mode. When the video decoder determines that the first intra prediction mode and the second intra prediction mode satisfy a weighted blending condition, the video decoder predicts the current block by using the first intra prediction mode to obtain a first prediction value of the current block, predicts the current block by using the second intra prediction mode to obtain a second prediction value of the current block, and obtains a target prediction value of the current block by performing weighted blending on the first prediction value and the second prediction value. Optionally, in addition to determining the first prediction value and second prediction value, a third prediction value may further be determined. For example, a third intra prediction mode is used to predict the current block to obtain the third prediction value of the current block, and then weighted blending is performed on the first prediction value, the second prediction value, and the third prediction value to obtain the target prediction value of the current block. Optionally, the third intra prediction mode may be a preset intra prediction mode, or may be determined in other manners, which are not limited in the present disclosure.

In some embodiments, if it is determined that the first intra prediction mode and the second intra prediction mode do not satisfy the weighted blending condition, one of the first intra prediction mode and the second intra prediction mode is used for prediction of the current block to obtain the target prediction value for the current block.

In some embodiments, the video decoder may use the following manner to determine that weighted blending prediction with multiple intra prediction modes are allowed for the current block. A second flag is signalled into a bitstream by a video encoder, where the second flag indicates whether the target prediction value of the current block is determined according to at least one of the first intra prediction mode, the second intra prediction mode, or the third intra prediction mode. If the video encoder determines the target prediction value according to at least one of the first intra prediction mode, the second intra prediction mode, or the third intra prediction mode, then the second flag is set as true, for example, a value of the second flag is set as 1. Then the second flag that is set as true is signalled into the bitstream, for example, signalled into a header of the bitstream. In this way, after obtaining the bitstream, the video decoder decodes the bitstream to obtain the second flag. If the second flag is true, for example, the value of the second flag is 1, then the video decoder determines that the target prediction value of the current block is determined according to at least one of the first intra prediction mode, the second intra prediction mode, or the third intra prediction mode. In this case, the video decoder determines the first intra prediction mode and the second intra prediction mode for the current block. Optionally, a manner in which the video decoder determines the first intra prediction mode and the second intra prediction mode is the same as a manner in which the video encoder determines the first intra prediction mode and the second intra prediction mode.

If the video encoder does not determine the target prediction value of the current block according to at least one of the first intra prediction mode, the second intra prediction mode, or the third intra prediction mode, then the second flag is set as false, for example, the value of the second flag is set as 0. Then the second flag that is set as false is signalled into the bitstream, for example, signalled into the header of the bitstream. The video decoder decodes the bitstream to obtain the second flag. If the second flag is false, for example, the value of the second flag is 0, the video decoder does not determine the first intra prediction mode and the second intra prediction mode for the current block. Instead, the decoder determines, by traversing other preset intra prediction modes, an intra prediction mode with the lowest cost to predict the current block, so as to obtain the target prediction value of the current block.

It may be noted that embodiments of the present disclosure mainly involve a case where the target prediction value of the current block is determined according to at least one of the first intra prediction mode, the second intra prediction mode, or the third intra prediction mode. That is to say, the present disclosure mainly focuses on the case where the second flag is true.

In a possible implementation, if the DIMD technology is used in the present disclosure, the second flag may be a DIMD enable flag, such as sps_dimd_enable_flag. That is to say, in embodiments of the present disclosure, the video decoder decodes the bitstream to first obtain a DIMD allowed flag, where the DIMD allowed flag is a sequence-level flag. The DIMD allowed flag indicates whether the DIMD technology is allowed for a current sequence. If the DIMD allowed flag is true, for example, equal to 1, then it is determined that the DIMD technology is allowed for the current sequence. Then, the video decoder continues to decode the bitstream to obtain the DIMD enable flag, where the DIMD enable flag may be a sequence-level flag. The DIMD enable flag indicates whether the DIMD technology is used for the current block. If the DIMD enable flag is true, for example, equal to 1, then it is determined that the DIMD technology is used for the current block. In this case, the video decoder performs operations at S401 to determine the first intra prediction mode and the second intra prediction mode for the current block.

Optionally, the DIMD enable flag may also be a picture-level flag, which indicates whether the DIMD technology is used for a current picture.

It may be noted that, the DIMD enable flag being true or false is determined and signalled into the bitstream by the video encoder. For example, if the video encoder uses the DIMD technology to determine the target prediction value of the current block, then the DIMD enable flag is set as true, for example, set as 1, and the TIMD enable flag is signalled into the bitstream, for example, signalled into the header of the bitstream. If the video encoder does not use the DIMD technology to determine the target prediction value of the current block, the DIMD enable flag is set as false, for example, set as 0, and the DIMD enable flag is signalled into the bitstream, for example, signalled into the header of the bitstream. In this way, the video decoder can parse out the DIMD enable flag from the bitstream, and determine according to the DIMD enable flag whether the DIMD technology is used to determine the target prediction value of the current block. Therefore, consistency between the decoding end and the encoding end can be ensured, and further reliability of prediction can be ensured.

When the video decoder determines that a target prediction value of the current block needs to be determined by at least one of the first intra prediction mode, the second intra prediction mode and the third intra prediction mode, it performs the above-described S401, determines the amplitude values of the N intra prediction modes corresponding to the reconstructed region adjacent to the current block, and determines, based on the amplitude values of the N intra prediction modes, the first intra prediction mode and the second intra prediction modes.

It should be noted that the reconstructed region adjacent to the current block may be any preset region in the reconstructed regions neighbouring to the current block.

Exemplarily, the reconstructed region adjacent to the current block includes m rows of reconstructed samples above the current block.

Exemplarily, the reconstructed region adjacent to the current block includes k columns of reconstructed samples to the left of the current block.

Exemplarily, the reconstructed region adjacent to the current block includes m rows of reconstructed samples above and to the upper left of the current block, which is determined as a template region of the current block.

Exemplarily, the reconstructed region adjacent to the current block includes m rows of reconstructed samples above and to the upper left of the current block, and k columns of reconstructed samples to the left of the current block, such as the L-shape region in FIG. 7A.

The above m and k may be the same or different, which is not limited in the present disclosure.

The above m rows of samples may or may not be adjacent to the current block.

The above k columns of pixels may or may not be adjacent to the current block.

In some embodiments, the process of determining the amplitude values of the N intra prediction modes corresponding to the reconstructed region may be as follows. First, with a sobel operator, each n×n (e.g., 3×3) region on the reconstructed region adjacent to the current block is scanned and gradients in the horizontal and vertical directions are calculated. The gradients Dx and Dy in the horizontal and vertical directions are derived respectively.

Exemplarily, a 3×3 horizontal sober filter and vertical sober filter are used to calculate a horizontal gradient Dx and a vertical gradient Dy, respectively, for a 3×3 region on the template region.

For example, the horizontal gradient Dx is calculated according to the following equation (4) and the vertical gradient Dy is calculated according to equation (5):

$$Dx = L_{horizontal} * A \quad (4)$$

$$Dx = L_{vertical} * A \quad (5)$$

where $L_{horizontal}$ is the horizontal sober filter, $L_{vertical}$ is the vertical sober filter, and A is a 3×3 region on the template region.

The horizontal and vertical gradients of each 3×3 region on the reconstructed region adjacent to the current block can be determined from the above equations. Next, the amplitude value and the angle value at each position are derived from Dx and Dy as: amp=Dx+Dy, angular=arctan (Dy/Dx). The angle at each position on the reconstructed region adjacent to the current block corresponds to a conventional angular prediction mode, and amplitude values of the same angular mode are accumulated to form the histogram illustrated in FIG. 7B. Based on this histogram, N intra prediction modes can be obtained.

Optionally, all intra prediction modes in the histogram may be determined as the N intra prediction modes.

Optionally, intra prediction modes in the histogram each of which has an amplitude value greater than a certain preset value may be determined as the N intra prediction modes.

In some embodiments, if the present disclosure is applied in DIMD technology, the above mentioned reconstructed region adjacent to the current block is a template region of the current block. As illustrated in FIG. 7A, the template region of the current block is a region adjacent to the current block in the reconstructed region adjacent to the current block. In some embodiments, the sample region of the current block is also referred to as a neighboring reconstructed sample region of the current block. In this case, the process of determining the amplitude values of the N intra prediction modes corresponding to the reconstructed region adjacent to the current block in the above-described S401 is as follows. When the DIMD enable flag indicates that the DIMD technology is used for the current block, the amplitude values of the N intra prediction modes corresponding to the template region of the current block are determined. The determination of the amplitude values of the N intra prediction modes corresponding to the template region of the current block is basically the same as the determination of the amplitude values of the N intra prediction modes corresponding to the reconstructed region adjacent to the current block as described above, as long as the reconstructed region adjacent to the current block is replaced with the template region of the current block.

According to the above method, after determining the amplitude values of the N intra prediction modes corresponding to the current block, the first intra prediction mode and the second intra prediction mode of the current block are determined based on the amplitude values of these N intra prediction modes.

In some embodiments, the manner of determining the first intra prediction mode and the second intra prediction mode for the current block based on the amplitude values of the N intra prediction modes includes the following.

Manner 1, any one of the N intra prediction modes is determined as the first intra prediction mode, and any one of the N intra prediction modes other than the first intra prediction mode is determined as the second intra prediction mode.

Manner 2, an intra prediction mode with the greatest amplitude value among the N intra prediction modes is determined as the first intra prediction mode, and the intra prediction mode with the second greatest amplitude value among the N intra prediction modes is determined as the second intra prediction mode.

After the first intra prediction mode and the second intra prediction mode of the current block are determined according to the above method, the following operations at S402 and S403 are performed.

S402, a weighted blending condition for the current block is determined according to the amplitude values of the first intra prediction mode and the second intra prediction mode.

The weighted blending condition is used to determine whether weighted prediction is performed on the current block based on the first intra prediction mode, the second intra prediction mode, and the third intra prediction mode.

In embodiments of the present disclosure, after the video decoder obtains the first intra prediction mode and the second intra prediction mode for the current block according to the operations at S401, the video decoder does not perform weighted prediction on the current block by directly using the first intra prediction mode and the second intra prediction mode, but needs to determine whether the first intra prediction mode and the second intra prediction mode satisfy the weighted blending condition for the current block. If the first intra prediction mode and the second intra prediction mode satisfy the weighted blending condition for the current block, weighted prediction is performed on the current block by using the first intra prediction mode, the second intra prediction mode, and the third intra prediction mode. For example, the current block is predicted by using the first intra prediction mode to obtain a first prediction value, the current block is predicted by using the second intra prediction mode to obtain a second prediction value, the current block is predicted by using the third intra prediction mode to obtain a third prediction value, and then the target prediction value of the current block is obtained by weighting the first prediction value, the second prediction value, and the third prediction value. Weights for the first prediction value, the second prediction value, and the third prediction value respectively may be determined according to the amplitude values corresponding to the first intra prediction mode and the second intra prediction mode.

If the first intra prediction mode and the second intra prediction mode do not satisfy the weighted blending condition for the current block, one of the first intra prediction mode, the second intra prediction mode, and the third intra prediction mode will be used to predict the current block to obtain the target prediction value for the current block. For example, the current block is predicted by using a prediction mode with the greatest amplitude value in the first intra prediction mode and the second intra prediction mode to obtain the target prediction value of the current block. Optionally, as can be seen from description of S401, the first intra prediction mode is the intra prediction mode with the greatest amplitude value among the N prediction modes, and the second intra prediction mode is the intra prediction mode with the second-greatest amplitude value among the N prediction modes, that is, the first amplitude value is larger than the second amplitude value. Therefore, when the first intra prediction mode and the second intra prediction mode do not satisfy the weighted blending condition for the current block, the current block is predicted by using the first intra prediction mode to obtain the target prediction value of the current block.

The current weighted blending condition has a wide range. For example, the weighted blending prediction can be carried out as long as neither the first intra prediction mode nor the second intra prediction mode is the Planar mode or the DC mode and the amplitude value of the second intra prediction mode is greater than 0. However, some image contents, such as screen-recorded image contents, are generally characterized by sharpness and colour vividness. When the weighted blending prediction is applied to these image contents, prediction quality will be degraded instead.

In order to solve the above technical problem, the present disclosure determines the weighted blending condition for the current block according to the amplitude values of the first intra prediction mode and the second intra prediction mode. The weighted blending condition in this case is stricter, which can reduce the probability of image quality degradation due to the weighted blending prediction on an image content to which the weighted blending prediction is not applicable.

The present disclosure does not limit the manner of determining the weighted blending condition for the current block according to the amplitude values of the first intra prediction mode and the second intra prediction mode in S402 above. Exemplarily, the manner includes but is not limited to the following.

Manner 1, the weighted blending condition for the current block is determined as that: a difference between the amplitude value of the first intra prediction mode and the amplitude value of the second prediction mode is less than preset value 1.

In manner 1, if the difference between the amplitude value of the first intra prediction mode and the amplitude value of the second intra prediction mode is greater than or equal to preset value 1, that is, the amplitude value corresponding to the first intra prediction mode is much greater than the amplitude value of the second intra prediction mode, it indicates that the probability of the first intra prediction mode being applicable to the current block is much greater than that of the second intra prediction mode. In this case, a better prediction efficiency can be achieved by using the first intra prediction mode to predict the current block. If all of the first intra prediction mode, the second intra prediction mode, and the third intra prediction mode are used to perform weighted prediction on the current block, noise will be brought instead and the prediction effect will be reduced.

In manner 1, if the difference between the amplitude value of the first intra prediction mode and the amplitude value of the second intra prediction mode is less than preset value 1, that is, the difference between the amplitude value corresponding to the first intra prediction mode and the amplitude value of the second intra prediction mode is not very large, it indicates that the probabilities of the first intra prediction mode and the second intra prediction mode being applicable to the current block are basically the same. In this case, the prediction effect is not the best if only the first intra prediction mode is used to predict the current block. Therefore, weighted prediction on the current block may be performed using the first intra prediction mode, the second intra prediction mode, and the third intra prediction mode, so as to improve the prediction effect of the current block.

The present disclosure does not limit the specific value of the above preset value 1, which may be determined according to the actual needs.

As can be seen from the above, by determining the weighted blending condition for the current block as that the difference between the amplitude value of the first intra prediction mode and the amplitude value of the second intra prediction mode is less than preset value 1, weighted blending prediction can be performed on the current block that needs weighted blending prediction, and the probability of performing weighted blending prediction on the image content that does not need weighted blending prediction can be reduced, which in turn improves the accuracy of intra prediction.

Manner 2, the weighted blending condition for the current block is determined as that: a ratio of the first amplitude value of the first intra prediction mode to the second amplitude value of the second intra prediction mode is less than or equal to a first preset threshold.

In manner 2, if the ratio of the first amplitude value of the first intra prediction mode to the second amplitude value of the second intra prediction mode is greater than the first preset threshold, that is, the amplitude value corresponding to the first intra prediction mode is much greater than the amplitude value of the second intra prediction mode, it indicates that the probability of the first intra prediction mode being applicable to the current block is much greater than that of the second intra prediction mode. In this case, a better prediction efficiency can be achieved by using the first intra prediction mode to predict the current block. If all of the first intra prediction mode, the second intra prediction mode, and the third intra prediction mode are used to perform weighted prediction on the current block, noise will be brought instead and the prediction effect will be reduced.

In manner 2, if the first amplitude value of the first intra prediction mode and the second amplitude value of the second intra prediction mode are less than or equal to the first preset threshold, that is, the difference between the amplitude value corresponding to the first intra prediction mode and the amplitude value of the second intra prediction mode is not very large, it indicates that the probabilities of the first intra prediction mode and the second intra prediction mode being applicable to the current block are basically the same. In this case, weighted blending prediction on the current block may be performed using the first intra prediction mode, the second intra prediction mode, and the third intra prediction mode, so as to improve the prediction effect of the current block.

In some embodiments, in order to further restrict the weighted blending process, before operations at S402, it is first necessary to determine whether the first intra prediction mode and the second intra prediction mode satisfy a first preset condition. The first preset condition is not specifically limited in embodiments of the present disclosure, which may be determined according to the actual needs. Exemplarily, the first preset condition is that: neither the first intra prediction mode nor the second intra prediction mode is the Planar mode or the DC mode, and the second amplitude value corresponding to the second intra prediction mode is not zero.

In this example, if the first intra prediction mode and the second intra prediction mode satisfy the first preset condition, the above operations at S402 is performed to determine the weighted blending condition for the current block based on the amplitude values of the first intra prediction mode and the second intra prediction mode.

If the first intra prediction mode and the second intra prediction mode do not satisfy the first preset condition, the above operations at S402 will not be performed, and instead one of the first intra prediction mode and the second intra prediction mode is used to predict the current block. For example, the first intra prediction mode is used to predict the current block, so as to obtain the target prediction value for the current block.

The current weighted blending condition is fixed, that is, the weighted blending condition for the current block does not change with the image content. However, some image contents such as screen-recorded image contents are often characterized by sharpness and colour vividness. When weighted blending prediction is performed on these image contents, sharpness and colour vividness are reduced because weighted blending prediction can be understood as a fuzzy prediction method, so that the prediction quality is reduced and noise is brought.

To solve the above technical problems, in the present disclosure, the weighted blending condition for the current block is determined according to the image content. That is to say, this disclosure provides differentiated weighted blending conditions for image contents, with different image contents corresponding to different weighted blending conditions, so that it can be ensured that weighted blending prediction is performed on image contents that require weighted blending prediction, thereby improving prediction accuracy. Weighted blending prediction will not be performed on the image contents that do not require weighted blending prediction, thereby avoiding introducing unnecessary noise and ensuring prediction quality.

A sequence includes a series of pictures, which are usually generated in the same environment, and thus the image contents of the pictures in the sequence are substantially the same. In the present disclosure, the image content of the current block are of the same type as the image content of the current sequence, for example, both are screen contents, or other contents captured by the camera, etc., and thus the image content of the current block can be determined from the image content of the current sequence.

In some embodiments, a video decoder may obtain the image content of the current sequence by means of image recognition. For example, during decoding the current sequence, the video decoder first decodes reconstructed pictures of the first few pictures, such as 2 pictures, in the current sequence by using an existing manner. A type of image contents of the reconstructed pictures of the first few pictures is obtained by means of image recognition on the reconstructed pictures of the first few pictures, and the type of image content of the reconstructed pictures of the first few pictures is regarded as the type of image content of the current sequence. In an example, the method in which the video decoder obtains the type of image content of the reconstructed pictures of the first few pictures by means of image recognition on the reconstructed pictures of the first few pictures, may be a neural network model-based method. For example, the neural network model is a pre-trained model that can recognize a type of an image content. The video decoder inputs the reconstructed pictures of the first few pictures into the neural network model, so as to obtain the type of image contents of the reconstructed pictures of the first few pictures, which is output by the neural network model. Optionally, the video decoder may also determine the type of image contents of the reconstructed pictures of the first few pictures by using other manners, and this disclosure is not limited in this regard.

In some embodiments, the video decoder may obtain the image content of the current sequence according to indication information in the bitstream. For example, a video encoder signals into the bitstream a type of the image content of the current sequence through a flag. The video decoder decodes the bitstream to obtain the flag, and determines the type of the image content of the current sequence according to the flag. For example, when a value of the flag is 1, it indicates that the image content of the current sequence is a first image content. When the value of the flag is 0, it indicates that the image content of the current sequence is a second image content. The first image content is different from the second image content.

After obtaining the image content corresponding to the current block according to the above manner, the weighted blending condition for the current block is determined according to the image content corresponding to the current block.

In some embodiments, if the image content corresponding to the current block is the first image content, the operations at S402 described above are performed, i.e., the weighted blending condition for the current block is determined according to the amplitude values of the first intra prediction mode and the second intra prediction mode. The manner for determining the weighted blending condition for the current block according to the amplitude values of the first intra prediction mode and the second intra prediction mode may be the above-mentioned manner 1 or manner 2, which will not be repeated herein.

In some embodiments, for determining the weighted blending condition for the current block according to the amplitude values of the first intra prediction mode and the second intra prediction mode, operations at S402 include the following operations.

S402-A, the bitstream is decoded to obtain a first flag, where the first flag indicates whether a first technology is used, and the first technology is used for a first image content.

S402-B, if the first flag indicates that the first technology is used, the weighted blending condition for the current block is determined according to the amplitude values of the first intra prediction mode and the second intra prediction mode.

In the present disclosure, the first image content may be an image content that is characterized by sharpness and colour vividness, such as a screen-recorded content.

In some embodiments of the present disclosure, it may be understood that the weighted blending condition may change only when the image content of the current block is the first image content, and the weighted blending condition does not change when the image content of the current block is not the first image content. That is to say, if the image content of the current block is the first image content, the weighted blending condition to be used is the first blending condition, and if the image content of the current block is not the first image content, the weighted blending condition to be used is the second blending condition. The first blending condition is different from the second blending condition. The first blending condition is determined according to the amplitude values of the first intra prediction mode and the second intra prediction mode. For examples, the first blending condition is determined as that: a ratio of the first amplitude value of the first intra prediction mode to the second amplitude value of the second intra prediction mode is less than or equal to a first preset threshold.

Based on this, in order to improve the efficiency of determining the weighted blending condition for the current block by the video decoder, if the video encoder determines that the image content corresponding to the current block is the first image content, the video encoder determines that the first technology can be used for the current block. The first technology can be understood as a technology provided in embodiments of the present disclosure, that is, the weighted blending condition for the current block is determined according to the amplitude values of the first intra prediction mode and the second intra prediction mode. If the video encoder determines that the first technology can be used for the current block, the video encoder sets the first flag as true and then signals the first flag into the bitstream, for example, a value of the first flag is 1. If the video encoder determines that the image content corresponding to the current block is not the first image content, the video encoder determines that the first technology cannot be used for the current block, and the video encoder sets the first flag as false and then signals the first flag into the bitstream, for example, the value of the first flag is 0. In this way, the video decoder decodes the bitstream to obtain the first flag, and then determines the weighted blending condition for the current block according to the first flag. For example, if the value of the first flag is 1, the weighted blending condition for the current block is determined according to the amplitude values of the first intra prediction mode and the second intra prediction mode. If the value of the first flag is 0, the weighted blending condition for the current block is determined according to another manner.

Optionally, the first flag may be a sequence-level flag, which indicates whether the first technology can be used for the current sequence.

Optionally, the first flag may be a picture-level flag, which indicates whether the first technology can be used for a current picture.

Optionally, a new field is added to the bitstream to represent the first flag. For example, a field sps_DIMD_blendoff_flag is used to represent the first flag, and the field is an entirely new field.

Optionally, the first flag is reused with a third flag of the current sequence, that is, an existing field in the current sequence can be reused without adding a new field, thereby saving codewords. For example, the third flag is an intra-block copy (IBC) enable flag or a template matching prediction (TMP) enable flag, etc.

In some embodiments, the weighted blending condition for the current block may be determined from multiple preset weighted blending conditions according to the first flag. For example, Table 1 illustrates the weighted blending conditions corresponding to the first flag.

TABLE 1

| Value of first flag | Type of weighted blending condition |
|---|---|
| 1 | First blending condition |
| 0 | Second blending condition |

Table 1 illustrates weighted blending conditions corresponding to different values of the first flag. When the value of the first flag is 1, it indicates that the image content corresponding to the current block is the first image content and the corresponding weighted blending condition is the first blending condition. Optionally, the first weighted blending condition for the current block is determined according to the amplitude values of the first intra prediction mode and the second intra prediction mode. For example, the first weighted blending condition for the current block is that: a ratio of the first amplitude value of the first intra prediction mode to the second amplitude value of the second intra prediction mode is less than or equal to a first preset threshold.

As indicated in Table 1, when the value of the first flag is 0, it indicates that the image content of the current block is not the first image content and the corresponding weighted blending condition is the second blending condition. Based on Table 1, the video decoder decodes the bitstream to obtain the first flag, and finds from Table 1 the weighted blending condition for the current block according to the value of the first flag. For example, when the value of the first flag is 1, it is determined that the weighted blending condition for the current block is the first blending condition, and when the value of the first flag is 0, it is determined that the weighted blending condition for the current block is the second blending condition.

S403, the target prediction value of the current block is determined according to the weighted blending condition and at least one of the first intra prediction mode, the second intra prediction mode, or the third intra prediction mode.

According to the above method, after the weighted blending condition for the current block is determined, whether or not to perform weighted blending prediction on the current block is determined based on the weighted blending condition. For example, if the first intra prediction mode and the second intra prediction mode satisfy the weighted blending condition for the current block, the weighted blending prediction is performed on the current block by using the first intra prediction mode, the second intra prediction mode, and the third intra prediction mode. If the first intra prediction mode and the second intra prediction mode do not satisfy the weighted blending condition for the current block, the weighted blending prediction is performed on the current block by using the first intra prediction mode and/or the second intra prediction mode.

The present disclosure does not limit the specific type of the third intra prediction mode.

In one example, the third intra prediction mode is an intra prediction mode with the third greatest amplitude value in the histogram described above.

In one example, the third intra prediction mode is the Planar mode or the DC mode.

In the present disclosure, the manner of determining the target prediction value of the current block according to the weighted blending condition and at least one of the first intra prediction mode, the second intra prediction mode, or the third intra prediction mode at S403 includes but is not limited to the following.

Manner 1, when the weighted blending condition for the current block is that the ratio of the first amplitude value of the first intra prediction mode to the second amplitude value of the second intra prediction mode is less than or equal to the first preset threshold, then the operations at S403 further include operations at S403-A1 as follows.

S403-A1, if the ratio of the first amplitude value to the second amplitude value is greater than the first preset threshold, the first intra prediction mode is used to determine the target prediction value for the current block.

In embodiments of the present disclosure, when the first intra prediction mode and the second intra prediction mode do not satisfy the above-determined weighted blending condition for the current block, it indicates that the first amplitude value corresponding to the first intra prediction mode is much larger than the second amplitude value corresponding to the second intra prediction mode. In this case, a better prediction effect can be realized by using the first intra prediction mode for predicting the current block, and weighted prediction is not needed.

In some embodiments, the operations at S403 further include operations at S403-A2 as follows S403-A2, if the ratio of the first amplitude value to the second amplitude value is less than or equal to the first preset threshold, the target prediction value for the current block is determined by using the first intra prediction mode, the second intra prediction mode, and the third intra prediction mode.

For example, the current block is predicted by using the first intra prediction mode, the second intra prediction mode, and the third intra prediction mode separately, to obtain respective prediction values. Then the prediction values corresponding to the respective intra prediction modes are weighted to obtain the target prediction value for the current block.

In some embodiments, the operations of determining the target prediction value of the current block using the first intra prediction mode, the second intra prediction mode, and the third intra prediction mode at S403-A2 above include the following operations.

S403-A21, weights corresponding to the first intra prediction mode, the second intra prediction mode, and the third intra prediction mode respectively are determined.

The manner of determining the weights corresponding to the first intra prediction mode, the second intra prediction mode, and the third intra prediction mode respectively includes but is not limited to the following examples.

Example 1, the weights corresponding to the first intra prediction mode, the second intra prediction mode, and the third intra prediction mode respectively are each a preset weight.

Optionally, the above three intra prediction modes correspond to the same weight, for example, each of the weights is $1/3$.

Optionally, since the first intra prediction mode is the intra prediction mode with the greatest amplitude value among the N intra prediction modes, the weight corresponding to the first intra prediction mode may be larger than the weights of the other two prediction modes.

Example 2, the weight corresponding to the third intra prediction mode is determined as a preset weight, and the weights corresponding to the first intra prediction mode and the second intra prediction mode respectively are determined according to the first amplitude value and the second amplitude value.

Optionally, the weight corresponding to the third intra prediction mode is determined to be a, where the value of a is not limited in this disclosure, such as $1/3$. Next, according to the first amplitude value and the second amplitude value, the weight corresponding to the first intra prediction mode and the weight corresponding to the second intra prediction mode are determined. For example, the weight corresponding to the first intra prediction mode is obtained by multiplying a ratio of the first amplitude value to a sum of the first amplitude value and the second amplitude value, by 1−a. Then the weight corresponding to the second intra prediction mode is obtained by multiplying a ratio of the second amplitude value to the sum of the first amplitude value and the second amplitude value, by 1−a.

S403-A22, prediction values of the current block are determined by using the first intra prediction mode, the second intra prediction mode, and the third intra prediction mode respectively to predict the current block.

Specifically, a first prediction value is obtained by predicting the current block using the first intra prediction mode, a second prediction value is obtained by predicting the current block using the second intra prediction mode, and a third prediction value is obtained by predicting the current block using the third intra prediction mode.

S403-A23, the target prediction value of the current block is obtained by weighting the prediction values with the weights corresponding to the first intra prediction mode, the second intra prediction mode, and the third intra prediction mode, respectively.

For example, the prediction values corresponding to the respective intra prediction modes are multiplied with the respective weights, the results of which are then summed to obtain the target prediction value of the current block. Exemplarily, the prediction values corresponding to the first intra prediction mode, the second intra prediction mode, and the third intra prediction mode, respectively, may be weighted according to the above formula (2) to obtain the target prediction value of the current block.

In embodiments of the present disclosure, the video decoder decodes the bitstream to obtain the first flag. If the first flag indicates that the first technology is used, the video decoder determines the weighted blending condition for the current block according to the first amplitude value of the first intra prediction mode and the second amplitude value of the second intra prediction mode. For example, the decoder determines the weighted blending condition for the current block as that the ratio of the first amplitude value of the first intra prediction mode to the second amplitude value of the second intra prediction mode is less than or equal to the first preset threshold. If the ratio of the first amplitude value to the second amplitude value is less than or equal to the first preset threshold, i.e., when the first intra prediction mode and the second intra prediction mode satisfy the weighted blending condition for the current block, the first intra prediction mode, the second intra prediction mode, and the third intra prediction mode are used to determine the target prediction value of the current block. If the ratio of the first amplitude value to the second amplitude value is greater than the first preset threshold, i.e., when the first intra prediction mode and the second intra prediction mode do not satisfy the weighted blending condition for the current block, then the first intra prediction mode is used to determine the target prediction value of the current block. That is to say, in the present disclosure, by determining the weighted blending condition for the current block as that the ratio of the first amplitude value to the second amplitude value is less than or equal to the first preset threshold, the weighted blending condition for the current block becomes more stringent, so that the probability of the first intra prediction mode and the second intra prediction mode satisfying the weighted blending condition proposed in the present disclosure is reduced, which can reduce the probability of performing weighted prediction on the current block of the first image content, thereby ensuring the prediction quality of the current block of the first image content.

Manner 2, if the weighted blending condition for the current block is that the ratio of the first amplitude value of the first intra prediction mode to the second amplitude value of the second intra prediction mode is less than or equal to the first preset threshold, then the operations at S403 further includes operations at S403-B1 as follows.

S403-B1, if the ratio of the first amplitude value to the second amplitude value is greater than the first preset threshold, the target prediction value for the current block is determined using the first intra prediction mode and the second intra prediction mode.

In manner 2, if the ratio of the first amplitude value to the second amplitude value is greater than the first preset threshold, in order to improve the prediction effect of the current block, the first intra prediction mode and the second intra prediction mode are used to determine the target prediction value of the current block. For example, the current block is predicted using the first intra prediction mode and the second intra prediction mode, respectively, and the prediction values obtained from predicting using these two intra prediction modes are weighted to obtain the target prediction value of the current block.

Optionally, the first weight and the second weight described above are preset values. For example, the first weight is the same as the second weight, both being ½. For another example, the first weight is greater than the second weight.

Optionally, the first weight and the second weight are determined according to the first amplitude value and the second amplitude value. In this case, the operations of determining the target prediction value of the current block by using the first intra prediction mode and the second intra prediction mode at S403-B1 include the following operations.

S403-B11, the current block is predicted using the first intra prediction mode to obtain a first prediction value.

S403-B12, the current block is predicted using the second intra prediction mode to obtain a second prediction value.

S403-B13, according to the first amplitude value and the second amplitude value, the first weight of the first prediction value and the second weight of the second prediction value are determined.

For example, a sum of the first amplitude value and the second amplitude value is determined, a ratio of the first amplitude value to the sum is determined as the first weight, and a ratio of the second amplitude value to the sum is determined as the second weight.

S403-B14, the target prediction value for the current block is determined according to the first prediction value, the second prediction value, the first weight, and the second weight.

For example, the sum of a product of the first prediction value and the first weight, and a product of the second prediction value and the second weight, is determined as the target prediction value of the current block.

In embodiments of the present disclosure, the video decoder decodes the bitstream to obtain the first flag. If the first flag indicates that the first technology is used, the video decoder determines the weighted blending condition for the current block according to the first amplitude value of the first intra prediction mode and the second amplitude value of the second intra prediction mode. For example, the decoder determines the weighted blending prediction condition for the current block as that the ratio of the first amplitude value of the first intra prediction mode to the second amplitude value of the second intra prediction mode is less than or equal to the first preset threshold. If the ratio of the first amplitude value to the second amplitude value is less than or equal to the first preset threshold, i.e., when the first intra prediction mode and the second intra prediction mode satisfy the weighted blending condition for the current block, the first intra prediction mode, the second intra prediction mode, and the third intra prediction mode are used to determine the target prediction value of the current block. If the ratio of the first amplitude value to the second amplitude value is greater than the first preset threshold, i.e., when the first intra prediction mode and the second intra prediction mode do not satisfy the weighted blending condition for the current block, the first intra prediction mode and the second intra prediction mode are used to determine the target prediction value of the current block. That is to say, in the present disclosure, by determining the weighted blending condition for the current block as that the ratio of the first amplitude value to the second amplitude value is less than or equal to the first preset threshold, the weighted blending condition for the current block becomes more stringent, so that the probability of the first intra prediction mode and the second intra prediction mode satisfying the weighted blending condition proposed in the present disclosure is reduced, which can reduce the probability of performing weighted prediction on the current block of the first image content, thereby ensuring the prediction quality of the current block of the first image content.

In some embodiments, whether to use the method of embodiments of the present disclosure is limited by a type of a current frame where the current block is located. In other words, whether to execute the operations of determining the weighted blending condition for the current block according to the amplitude values of the first intra prediction mode and the second intra prediction mode at S402, is determined according to the type of the current frame. It is specified in this embodiment that the method of embodiments of the present disclosure can be used for some types of frames and cannot be used for other types of frames, so that differentiated execution can be realized. For example, when the type of the current frame is a target frame-type, the weighted blending condition for the current block is determined according to the amplitude values of the first intra prediction mode and the second intra prediction mode. For example, the technical solution of the present disclosure is allowed for an I frame and is not allowed for a B frame. The present disclosure does not limit the target frame-type, which can be determined according to actual needs. Optionally, the target frame-type includes at least one of an I frame, a P frame, or a B frame.

In some embodiments, whether to use the method of embodiments of the present disclosure is limited by the type of a frame and the size of a picture block. In this case, before executing the method of embodiments of the present disclosure, the video decoder first determines the type of the current frame where the current block is located and the size of the current block, and then determines, according to the type of the current frame and the size of the current block, whether to determine the weighted blending condition for the current block according to the amplitude values of the first intra prediction mode and the second intra prediction mode.

It may be noted that in embodiments of the present disclosure, the size of the current block may include a height and a width of the current block. Therefore, the video decoder determines according to the height and the width of the current block whether to execute the operations at S402.

Exemplarily, in the present disclosure, when the type of the current frame is a first frame-type and the size of the current block is greater than a first threshold, the weighted blending condition for the current block is determined according to the amplitude values of the first intra prediction mode and the second intra prediction mode.

Exemplarily, in the present disclosure, when the type of the current frame is a second frame-type and the size of the current block is greater than a second threshold, the weighted blending condition for the current block is determined according to the amplitude values of the first intra prediction mode and the second intra prediction mode.

Optionally, the first frame-type is different from the second frame-type.

Optionally, the first threshold is also different from the second threshold.

The present disclosure does not limit specific types of the first frame-type and the second frame-type, and does not limit specific values of the first threshold and the second threshold.

In a specific example, if the first frame-type is the I frame and the second frame-type is the B frame or the P frame, the second threshold is different from the first threshold. That is, applicable block sizes specified for the I frame and the B frame (or the P frame) respectively may be different.

In some embodiments, whether to use the method of embodiments of the present disclosure may be further limited by a quantization parameter. In this case, before executing the method of embodiments of the present disclosure, the video decoder first decodes the bitstream to obtain a quantization parameter corresponding to the current block. For example, the video decoder obtains the quantization parameter of the current block according to a frame-level allowed flag or a sequence-level QP allowed flag. Then, according to the quantization parameter, the video decoder determines whether to determine the weighted blending condition for the current block according to the amplitude values of the first intra prediction mode and the second intra prediction mode.

Exemplarily, when the quantization parameter is less than a third threshold, the weighted blending condition for the current block is determined according to the amplitude values of the first intra prediction mode and the second intra prediction mode. The present disclosure does not limit a specific value of the third threshold, which may be determined according to actual needs.

After the video decoder obtains the prediction value of the current block according to the above method, the video decoder decodes the bitstream to obtain a residual value of the current block, and adds a prediction block and a residual block to obtain a reconstructed block of the current block.

In the intra prediction method of embodiments of the present disclosure, the video decoder decodes the bitstream to determine the amplitude values of N intra prediction modes corresponding to the reconstructed region adjacent to the current block, and determines the first intra prediction mode and the second intra prediction mode for the current block according to the amplitude values of the N intra prediction modes, where N is an integer greater than 1. Next, the video decoder determines the weighted blending condition for the current block the amplitude values of the first intra prediction mode and the second intra prediction mode, where the weighted blending condition is used to determine whether weighted prediction is performed on the current block based on the first intra prediction mode, the second intra prediction mode, and the third intra prediction mode. Then, the video decoder determines the target prediction value of the current block according to the weighted blending condition and at least one of the first intra prediction mode, the second intra prediction mode, or a third intra prediction mode. That is, in the present disclosure, the weighted blending condition for the current block is determined according to the amplitude values of the first intra prediction mode and the second intra prediction mode, and whether to perform weighted blending prediction on the current block is determined based on the weighted blending condition. In this way, the problem of lowering the prediction quality and introducing unexpected noise due to weighted blending prediction of image contents that do not need weighted blending prediction, can be avoided, and thus the accuracy of intra prediction can be improved.

A decoding process in which the intra prediction method provided in the present disclosure is combined with the DIMD technology will be introduced below.

Figure 9:
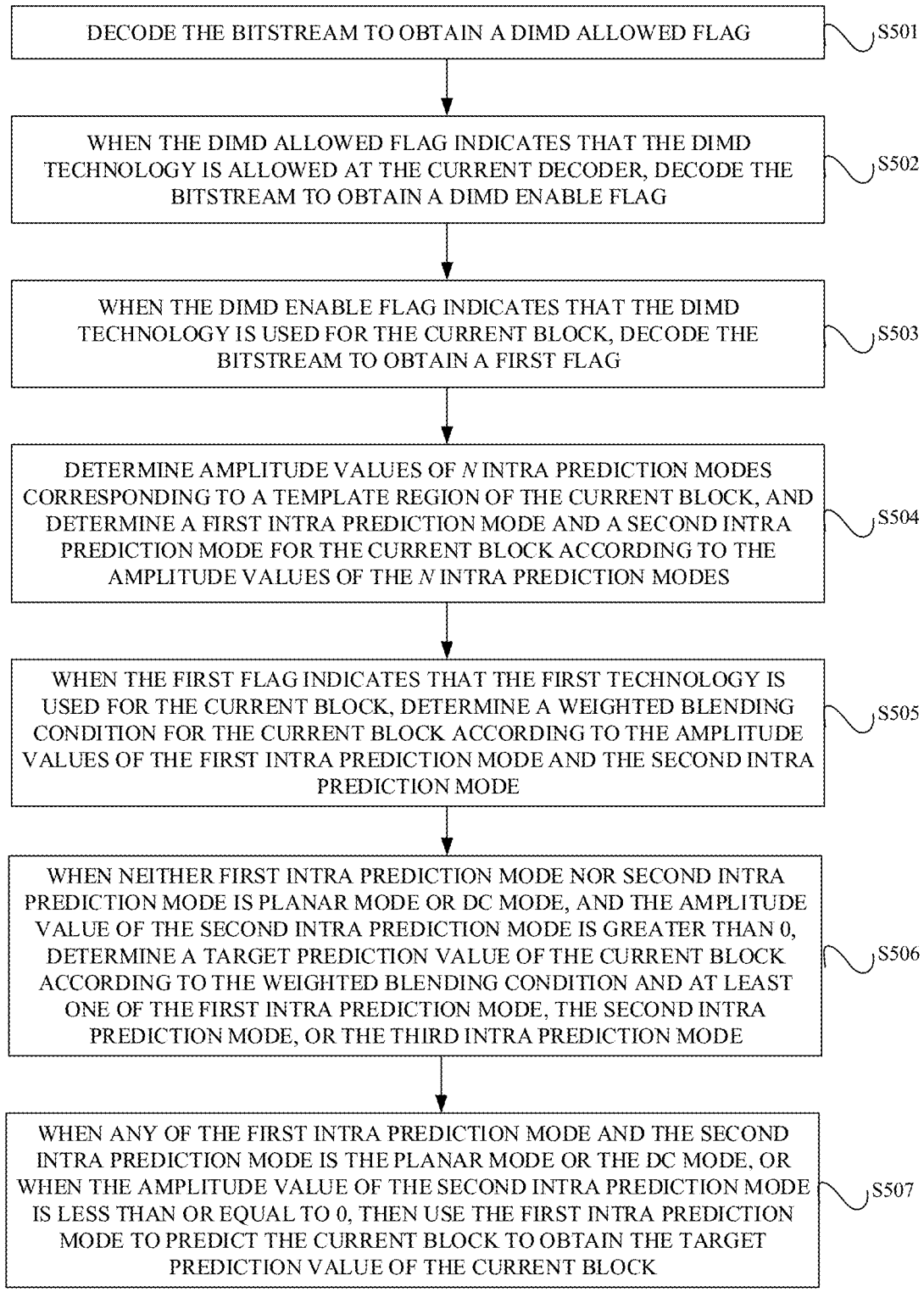
FIG. 9 is a schematic flowchart of an intra prediction method provided in embodiments of the present disclosure.

FIG. 9 is a schematic flowchart of an intra prediction method provided in embodiments of the present disclosure. As illustrated in FIG. 9, the intra prediction method includes the following.

S501, the bitstream is decoded to obtain a DIMD allowed flag.

The DIMD allowed flag is used to indicate whether the DIMD technology is allowed at the current decoder, or indicate whether the DIMD technology is allowed for the current sequence.

S502, when the DIMD allowed flag indicates that the DIMD technology is allowed at the current decoder, the bitstream is decoded to obtain a DIMD enable flag.

The DIMD enable flag is used to indicate whether the DIMD technology is used for the current block.

S503, when the DIMD enable flag indicates that the DIMD technology is used for the current block, the bitstream is decoded to obtain a first flag.

The first flag is used to indicate whether a first technology is used, where the first technology is used for a first image content.

S504, amplitude values of N intra prediction modes corresponding to a template region of the current block are determined, and a first intra prediction mode and a second intra prediction mode for the current block are determined according to the amplitude values of the N intra prediction modes.

For specific description, reference is made to the description of S401 above, which will not be repeated herein.

S505, when the first flag indicates that the first technology is used for the current block, a weighted blending condition for the current block is determined according to the amplitude values of the first intra prediction mode and the second intra prediction mode.

For example, a first blending condition is determined as that: a ratio of the first amplitude value of the first intra prediction mode to the second amplitude value of the second intra prediction mode is less than or equal to a first preset threshold.

For specific description, reference is made to the description of S402 above, which will not be repeated herein.

S506, when neither the first intra prediction mode nor the second intra prediction mode is the Planar mode or the DC mode, and the amplitude value of the second intra prediction mode is greater than 0, then a target prediction value of the current block is determined according to the weighted blending condition and at least one of the first intra prediction mode, the second intra prediction mode, or the third intra prediction mode.

For example, if the ratio of the first amplitude value to the second amplitude value is greater than the first preset threshold, the first intra prediction mode is used to determine the target prediction value for the current block. Alternatively, if the ratio of the first amplitude value to the second amplitude value is greater than the first preset threshold, the first intra prediction mode and the second intra prediction mode are used to determine the target prediction value for the current block.

For another example, if the ratio of the first amplitude value to the second amplitude value is less than or equal to the first preset threshold, the target prediction value for the current block is determined using the first intra prediction mode, the second intra prediction mode, and the third intra prediction mode.

For specific description, reference is made to the description of S403 above, which will not be repeated herein.

S507, when any of the first intra prediction mode and the second intra prediction mode is the Planar mode or the DC mode, or when the amplitude value of the second intra prediction mode is less than or equal to 0, then the first intra prediction mode is used to predict the current block to obtain the target prediction value of the current block.

After obtaining the target prediction value of the current block according to the above method, the video decoder decodes the bitstream to obtain the residual value of the current block, and adds a prediction block to the residual block to obtain a reconstruction block of the current block.

In embodiments of the present disclosure, by adjusting the weighted blending conditions in the DIMD technology, such as determining the weighted blending condition for the current block according to the amplitude values of the first intra prediction mode and the second intra prediction mode, the probability that the first intra prediction mode and the second intra prediction mode satisfy the weighted blending condition proposed in the present disclosure can be lowered, which can lower the probability of performing the weighted prediction on the current block of the first image content. Thereby, the prediction quality of the current block of the first image content can be ensured.

Further, after the method of the embodiments of the present disclosure is integrated to the latest ECM 2.0, tests are conducted under common test conditions, that is, All Intra Prediction (AI in short) and Low Delay (LD in short) conditions, and the test results are shown in Table 2.

TABLE 2

| | All Intra Prediction (All Intra Main10) Over ECM2.0 | | | | |
|---|---|---|---|---|---|
| | Y | U | V | EncT | DecT |
| Class A1 | 0.00% | 0.00% | 0.00% | 100% | 100% |
| Class A2 | 0.00% | 0.00% | 0.00% | 100% | 100% |
| Class B | 0.00% | 0.00% | 0.00% | 100% | 100% |
| Class C | 0.00% | 0.00% | 0.00% | 100% | 100% |
| Class E | 0.00% | 0.00% | 0.00% | 100% | 100% |

TABLE 2-continued

| | All Intra Prediction (All Intra Main10) Over ECM2.0 | | | | |
|---|---|---|---|---|---|
| | Y | U | V | EncT | DecT |
| Overall | 0.00% | 0.00% | 0.00% | 100% | 100% |
| Class D | 0.00% | 0.00% | 0.00% | 100% | 100% |
| Class F | −0.16% | −0.11% | −0.05% | 100% | 100% |

TABLE 3

| | Low Delay (LD) Over ECM2.0 | | | | |
|---|---|---|---|---|---|
| | Y | U | V | EncT | DecT |
| Class A1 | | | | | |
| Class A2 | | | | | |
| Class B | 0.00% | 0.00% | 0.00% | 100% | 100% |
| Class C | 0.00% | 0.00% | 0.00% | 100% | 100% |
| Class E | 0.00% | 0.00% | 0.00% | 100% | 100% |
| Overall | 0.00% | 0.00% | 0.00% | 100% | 100% |
| Class D | 0.00% | 0.00% | 0.00% | 100% | 100% |
| Class F | −0.18% | −0.66% | −0.23% | 100% | 100% |

Notably, since only the class F sequence in the existing common test conditions for the ECM software of JVET is a screen content coding sequence, a sequence-level flag (for example, the above first flag) is used in the tests, to allow the method to be used only in the case of screen content (that is, the first image content) coding. Therefore, only class F has fluctuations in performance.

As can be seen from the tests in Table 2 and Table 3, the present disclosure achieves improvement in decoding performance under both AI and LD conditions, and the improvement is relatively stable, with an average of 0.16% improvement in decoding performance for AI and an average of 0.18% improvement in decoding performance for LD. In addition, the technical solution of this disclosure has almost no influence on the complexity of hardware and software, and it can be seen from the coding time on the reference software that there is also no fluctuation in program runtime.

The decoding method in embodiments of the present disclosure is introduced above. On this basis, an encoding method provided in embodiments of the present disclosure is introduced below.

Figure 10:
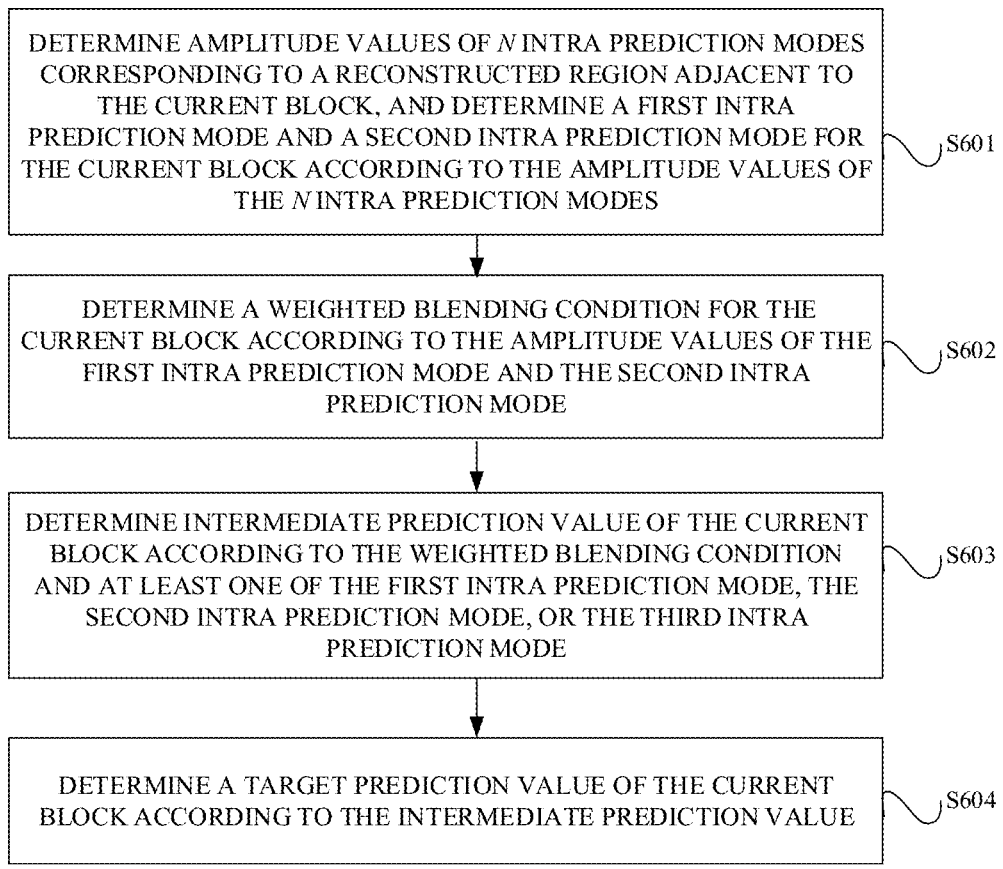
FIG. 10 is a schematic flowchart of an intra prediction method provided in embodiments of the present disclosure.

FIG. 10 is a schematic flowchart of an intra prediction method provided in embodiments of the present disclosure. As illustrated in FIG. 8, the method in embodiments of the present disclosure includes the following.

S601, amplitude values of N intra prediction modes corresponding to a reconstructed region adjacent to the current block are determined, and a first intra prediction mode and a second intra prediction mode for the current block are determined according to the amplitude values of the N intra prediction modes, where N is a positive integer greater than 1.

During video encoding, the video encoder receives a video stream that consists of a sequence of pictures. Video encoding is performed on each picture in the video stream. The video encoder partitions the picture to obtain a current block.

In some embodiments, the current block is also referred to as a current encoding block, a current picture, an encoding block, a current encoding unit, a current block to-be-decoded, a current picture block to-be-decoded etc.

For a traditional division manner, a block after division includes both the chroma component and the luma component at a location of the current block. In comparison, for a dual tree technology, a block of a separate component can be obtained, such as a separate luma block and a separate chroma block. It can be understood that the luma block includes only the luma component at the location of the current block, and the chroma block includes only the chroma component at the location of the current block. As such, the luma component and the chroma component at the same location may belong to different blocks, which enables better flexibility of division. If the dual tree technology is used for CU division, some CUs may include both the luma component and the chroma component, some CUs may include only the luma component, and some CUs may include only the chroma component.

In some embodiments, the current block includes only a chroma component, which can be understood as a chroma block.

In some embodiments, the current block includes only a luma component, which can be understood as a luma block.

In some embodiments, the current block includes both the chroma component and the luma component.

It is to be noted that, when the video encoder determines that weighted blending prediction with multiple intra prediction modes (such as DIMD technology) are allowed for the current block, the video encoder determines the first intra prediction mode and the second intra prediction mode. When the video decoder determines that the first intra prediction mode and the second intra prediction mode satisfy a weighted blending condition, the video decoder predicts the current block by using the first intra prediction mode to obtain a first prediction value of the current block, predicts the current block by using the second intra prediction mode to obtain a second prediction value of the current block, and obtains a target prediction value of the current block by performing weighted blending on the first prediction value and the second prediction value. Optionally, in addition to determining the first prediction value and second prediction value, a third prediction value may further be determined. For example, a third intra prediction mode is used to predict the current block to obtain the third prediction value of the current block, and then weighted blending is performed on the first prediction value, the second prediction value, and the third prediction value to obtain the target prediction value of the current block. Optionally, the third intra prediction mode may be a preset intra prediction mode, or may be determined in other manners, which are not limited in the present disclosure.

In some embodiments, if it is determined that the first intra prediction mode and the second intra prediction mode do not satisfy the weighted blending condition, one of the first intra prediction mode and the second intra prediction mode is used for prediction of the current block to obtain the target prediction value for the current block.

In some embodiments, a second flag is signalled into a bitstream by the video encoder, where the second flag indicates whether the target prediction value of the current block is determined according to at least one of the first intra prediction mode, the second intra prediction mode, or the third intra prediction mode. If the video encoder determines the target prediction value according to at least one of the first intra prediction mode, the second intra prediction mode, or the third intra prediction mode, then the second flag is set as true, for example, a value of the second flag is set as 1. Then the second flag that is set as true is signalled into the bitstream, for example, signalled into a header of the bitstream. In this way, after obtaining the bitstream, the video decoder decodes the bitstream to obtain the second flag. If the second flag is true, for example, the value of the second flag is 1, then the video decoder determines that the target prediction value of the current block is determined according to at least one of the first intra prediction mode, the second intra prediction mode, or the third intra prediction mode. In this case, the video decoder determines the first intra prediction mode and the second intra prediction mode for the current block.

If the video encoder does not determine the target prediction value of the current block according to at least one of the first intra prediction mode, the second intra prediction mode, or the third intra prediction mode, then the second flag is set as false, for example, the value of the second flag is set as 0. Then the second flag that is set as false is signalled into the bitstream, for example, signalled into the header of the bitstream. The video decoder decodes the bitstream to obtain the second flag. If the second flag is false, for example, the value of the second flag is 0, the video decoder does not determine the first intra prediction mode and the second intra prediction mode for the current block. Instead, the decoder determines, by traversing other preset intra prediction modes, an intra prediction mode with the lowest cost to predict the current block, so as to obtain the target prediction value of the current block.

It may be noted that embodiments of the present disclosure mainly involve a case where the target prediction value of the current block is determined according to at least one of the first intra prediction mode, the second intra prediction mode, or the third intra prediction mode. That is to say, the present disclosure mainly focuses on the case where the second flag is true.

In a possible implementation, if the DIMD technology is used in the present disclosure, the second flag may be a DIMD enable flag, such as sps_DIMD_enable_flag. That is to say, the video encoder obtains a DIMD allowed flag, where the DIMD allowed flag is a sequence-level flag. The DIMD allowed flag indicates whether the DIMD technology is allowed for a current sequence. If the video encoder determines that the DIMD technology is allowed for the current sequence, the DIMD allowed flag is set as true, for example, set as 1. Then, the video encoder determines the first intra prediction mode and the second intra prediction mode for the current block, and performs the method in embodiments of the present disclosure. When the video encoder uses the DIMD technology to determine the target prediction value of the current block, then the DIMD enable flag is set as true, for example, set as 1, and the TIMD enable flag is signalled into the bitstream, for example, signalled into the header of the bitstream. When the video encoder does not use the DIMD technology to determine the target prediction value of the current block, the DIMD enable flag is set as false, for example, set as 0, and the DIMD enable flag is signalled into the bitstream, for example, signalled into the header of the bitstream. In this way, the video decoder can parse out the DIMD enable flag from the bitstream, and determine according to the DIMD enable flag whether the DIMD technology is used to determine the target prediction value of the current block. Therefore, consistency between the decoding end and the encoding end can be ensured, and further reliability of prediction can be ensured.

It should be noted that the reconstructed region adjacent to the current block may be any preset region in the reconstructed regions neighbouring to the current block.

Exemplarily, the reconstructed region adjacent to the current block includes m rows of reconstructed samples above the current block.

Exemplarily, the reconstructed region adjacent to the current block includes k columns of reconstructed samples to the left of the current block.

Exemplarily, the reconstructed region adjacent to the current block includes m rows of reconstructed samples above and to the upper left of the current block, which is determined as a template region of the current block.

Exemplarily, the reconstructed region adjacent to the current block includes m rows of reconstructed samples above and to the upper left of the current block, and k columns of reconstructed samples to the left of the current block, such as the L-shape region in FIG. 7A.

The above m and k may be the same or different, which is not limited in the present disclosure.

The above m rows of samples may or may not be adjacent to the current block.

The above k columns of pixels may or may not be adjacent to the current block.

In some embodiments, the process of determining the amplitude values of the N intra prediction modes corresponding to the reconstructed region may be as follows. First, with a sobel operator, each n×n (e.g., 3×3) region on the reconstructed region adjacent to the current block is scanned and gradients in the horizontal and vertical directions are calculated. The gradients Dx and Dy in the horizontal and vertical directions are derived respectively.

Exemplarily, a 3×3 horizontal sober filter and vertical sober filter are used to calculate a horizontal gradient Dx and a vertical gradient Dy, respectively, for a 3×3 region on the template region. For example, the horizontal gradient Dx is calculated according to the above equation (4) and the vertical gradient Dy is calculated according to above equation (5).

The horizontal and vertical gradients of each 3×3 region on the reconstructed region adjacent to the current block are determined from the above equations. Next, the amplitude value and the angle value at each position are derived from Dx and Dy as: amp=Dx+Dy, angular=arctan (Dy/Dx). The angle at each position on the reconstructed region adjacent to the current block corresponds to a conventional angular prediction mode, and amplitude values of the same angular mode are accumulated to form the histogram illustrated in FIG. 7B. Based on this histogram, N intra prediction modes corresponding to the current block can be obtained.

Optionally, all intra prediction modes in the histogram may be determined as the N intra prediction modes.

Optionally, intra prediction modes in the histogram each of which has an amplitude value greater than a certain preset value may be determined as the N intra prediction modes.

In some embodiments, if the present disclosure is applied in DIMD technology, the above mentioned reconstructed region adjacent to the current block is a template region of the current block. As illustrated in FIG. 7A, the template region of the current block is a region adjacent to the current block in the reconstructed region adjacent to the current block. In some embodiments, the sample region of the current block is also referred to as a neighboring reconstructed sample region of the current block. In this case, the process of determining the amplitude values of the N intra prediction modes corresponding to the reconstructed region adjacent to the current block in the above-described S601 is as follows. The amplitude values of the N intra prediction modes corresponding to the template region of the current block are determined. The determination of the amplitude values of the N intra prediction modes corresponding to the template region of the current block is basically the same as the determination of the amplitude values of the N intra prediction modes corresponding to the reconstructed region adjacent to the current block as described above, as long as the reconstructed region adjacent to the current block is replaced with the template region of the current block.

According to the above method, after determining the amplitude values of the N intra prediction modes corresponding to the current block, the first intra prediction mode and the second intra prediction mode of the current block are determined based on the amplitude values of these N intra prediction modes.

In some embodiments, the manner of determining the first intra prediction mode and the second intra prediction mode for the current block based on the amplitude values of the N intra prediction modes includes the following.

Manner 1, any one of the N intra prediction modes is determined as the first intra prediction mode, and any one of the N intra prediction modes other than the first intra prediction mode is determined as the second intra prediction mode.

Manner 2, an intra prediction mode with the greatest amplitude value among the N intra prediction modes is determined as the first intra prediction mode, and the intra prediction mode with the second greatest amplitude value among the N intra prediction modes is determined as the second intra prediction mode.

After the first intra prediction mode and the second intra prediction mode of the current block are determined according to the above method, the following operations at S602 and S603 are performed.

S602, a weighted blending condition for the current block is determined according to the amplitude values of the first intra prediction mode and the second intra prediction mode.

The weighted blending condition is used to determine whether weighted prediction is performed on the current block based on the first intra prediction mode, the second intra prediction mode, and the third intra prediction mode.

In embodiments of the present disclosure, after the video encoder obtains the first intra prediction mode and the second intra prediction mode for the current block according to the operations at S601, the video encoder does not perform weighted prediction on the current block by directly using the first intra prediction mode and the second intra prediction mode, but needs to determine whether the first intra prediction mode and the second intra prediction mode satisfy the weighted blending condition for the current block. If the first intra prediction mode and the second intra prediction mode satisfy the weighted blending condition for the current block, weighted prediction is performed on the current block by using the first intra prediction mode, the second intra prediction mode, and the third intra prediction mode. For example, the current block is predicted by using the first intra prediction mode to obtain a first prediction value, the current block is predicted by using the second intra prediction mode to obtain a second prediction value, the current block is predicted by using the third intra prediction mode to obtain a third prediction value, and then the intermediate prediction value of the current block is obtained by weighting the first prediction value, the second prediction value, and the third prediction value. Weights for the first prediction value, the second prediction value, and the third prediction value respectively may be determined according to the amplitude values corresponding to the first intra prediction mode and the second intra prediction mode.

If the first intra prediction mode and the second intra prediction mode do not satisfy the weighted blending condition for the current block, one of the first intra prediction mode, the second intra prediction mode, and the third intra prediction mode will be used to predict the current block to obtain the target prediction value for the current block. For example, the current block is predicted by using a prediction mode with the greatest amplitude value in the first intra prediction mode and the second intra prediction mode to obtain the target prediction value of the current block. Optionally, as can be seen from description of S601, the first intra prediction mode is the intra prediction mode with the greatest amplitude value among the N prediction modes, and the second intra prediction mode is the intra prediction mode with the second-greatest amplitude value among the N prediction modes, that is, the first amplitude value is larger than the second amplitude value. Therefore, when the first intra prediction mode and the second intra prediction mode do not satisfy the weighted blending condition for the current block, the current block is predicted by using the first intra prediction mode to obtain the target prediction value of the current block.

The current weighted blending condition has a wide range. For example, the weighted blending prediction can be carried out as long as neither mode1 nor mode2 is the Planar mode or the DC mode and the amplitude value of mode2 is greater than 0. However, some image contents, such as screen-recorded image contents, are generally characterized by sharpness and colour vividness. When the weighted blending prediction is applied to these image contents, prediction quality will be degraded instead.

In order to solve the above technical problem, the present disclosure determines the weighted blending condition for the current block according to the amplitude values of the first intra prediction mode and the second intra prediction mode. The weighted blending condition in this case is stricter, which can reduce the probability of image quality degradation due to the weighted blending prediction on an image content to which the weighted blending prediction is not applicable.

The present disclosure does not limit the manner of determining the weighted blending condition for the current block according to the amplitude values of the first intra prediction mode and the second intra prediction mode in S602 above. Exemplarily, the manner includes but is not limited to the following.

Manner 1, the weighted blending condition for the current block is determined as that: a difference between the amplitude value of the first intra prediction mode and the amplitude value of the second prediction mode is less than preset value 1.

In manner 1, if the difference between the amplitude value of the first intra prediction mode and the amplitude value of the second intra prediction mode is greater than or equal to preset value 1, that is, the amplitude value corresponding to the first intra prediction mode is much greater than the amplitude value of the second intra prediction mode, it indicates that the probability of the first intra prediction mode being applicable to the current block is much greater than that of the second intra prediction mode. In this case, a better prediction efficiency can be achieved by using the first intra prediction mode to predict the current block. If all of the first intra prediction mode, the second intra prediction mode, and the third intra prediction mode are used to perform weighted prediction on the current block, noise will be brought instead and the prediction effect will be reduced.

In manner 1, if the difference between the amplitude value of the first intra prediction mode and the amplitude value of the second intra prediction mode is less than preset value 1, that is, the difference between the amplitude value corresponding to the first intra prediction mode and the amplitude value of the second intra prediction mode is not very large, it indicates that the probabilities of the first intra prediction mode and the second intra prediction mode being applicable to the current block are basically the same. In this case, the prediction effect is not the best if only the first intra prediction mode is used to predict the current block. Therefore, weighted prediction on the current block may be performed using the first intra prediction mode, the second intra prediction mode, and the third intra prediction mode, so as to improve the prediction effect of the current block.

The present disclosure does not limit the specific value of the above preset value 1, which may be determined according to the actual needs.

As can be seen from the above, by determining the weighted blending condition for the current block as that the difference between the amplitude value of the first intra prediction mode and the amplitude value of the second intra prediction mode is less than preset value 1, weighted blending prediction can be performed on the current block that needs weighted blending prediction, and the probability of performing weighted blending prediction on the image content that does not need weighted blending prediction can be reduced, which in turn improves the accuracy of intra prediction.

Manner 2, the weighted blending condition for the current block is determined as that: a ratio of the first amplitude value of the first intra prediction mode to the second amplitude value of the second intra prediction mode is less than or equal to a first preset threshold.

In manner 2, if the ratio of the first amplitude value of the first intra prediction mode to the second amplitude value of the second intra prediction mode is greater than the first preset threshold, that is, the amplitude value corresponding to the first intra prediction mode is much greater than the amplitude value of the second intra prediction mode, it indicates that the probability of the first intra prediction mode being applicable to the current block is much greater than that of the second intra prediction mode. In this case, a better prediction efficiency can be achieved by using the first intra prediction mode to predict the current block. If all of the first intra prediction mode, the second intra prediction mode, and the third intra prediction mode are used to perform weighted prediction on the current block, noise will be brought instead and the prediction effect will be reduced.

In manner 2, if the first amplitude value of the first intra prediction mode and the second amplitude value of the second intra prediction mode are less than or equal to the first preset threshold, that is, the difference between the amplitude value corresponding to the first intra prediction mode and the amplitude value of the second intra prediction mode is not very large, it indicates that the probabilities of the first intra prediction mode and the second intra prediction mode being applicable to the current block are basically the same. In this case, weighted blending prediction on the current block may be performed using the first intra prediction mode, the second intra prediction mode, and the third intra prediction mode, so as to improve the prediction effect of the current block.

In some embodiments, in order to further restrict the weighted blending process, before operations at S602, it is first necessary to determine whether the first intra prediction mode and the second intra prediction mode satisfy a first preset condition. The first preset condition is not specifically limited in embodiments of the present disclosure, which may be determined according to the actual needs. Exemplarily, the first preset condition is that: neither the first intra prediction mode nor the second intra prediction mode is the Planar mode or the DC mode, and the second amplitude value corresponding to the second intra prediction mode is not zero.

In this example, if the first intra prediction mode and the second intra prediction mode satisfy the first preset condition, the above operations at S602 is performed to determine the weighted blending condition for the current block based on the amplitude values of the first intra prediction mode and the second intra prediction mode.

If the first intra prediction mode and the second intra prediction mode do not satisfy the first preset condition, the above operations at S602 will not be performed, and instead one of the first intra prediction mode and the second intra prediction mode is used to predict the current block. For example, the first intra prediction mode is used to predict the current block, so as to obtain the target prediction value for the current block.

The current weighted blending condition is fixed, that is, the weighted blending condition for the current block does not change with the image content. However, some image contents such as screen-recorded image contents are often characterized by sharpness and colour vividness. When weighted blending prediction is performed on these image contents, sharpness and colour vividness are reduced because weighted blending prediction can be understood as a fuzzy prediction method, so that the prediction quality is reduced and noise is brought.

To solve the above technical problems, in the present disclosure, the weighted blending condition for the current block is determined according to the image content. That is to say, this disclosure provides differentiated weighted blending conditions for image contents, with different image contents corresponding to different weighted blending conditions, so that it can be ensured that weighted blending prediction is performed on image contents that require weighted blending prediction, thereby improving prediction accuracy. Weighted blending prediction will not be performed on the image contents that do not require weighted blending prediction, thereby avoiding introducing unnecessary noise and ensuring prediction quality.

A sequence includes a series of pictures, which are usually generated in the same environment, and thus the image contents of the pictures in the sequence are substantially the same. In the present disclosure, the image content of the current block is of the same type as the image content of the current sequence, for example, both are screen contents, or other contents captured by the camera, etc.

In some embodiments, the weighted blending condition for the current block is determined according to the image content of the current sequence. For example, when determining that the image content corresponding to the current block is a first image content, the video encoder determines the weighted blending condition for the current block according to the amplitude values of the first intra prediction mode and the second intra prediction mode. When the image content corresponding to the current block is a second image content, the video encoder determines the weighted blending condition for the current block according to other manners.

In some embodiments, the video encoder signals into the bitstream a type of the image content of the current sequence through a flag. The video decoder decodes the bitstream to obtain the flag, and determines the type of the image content of the current sequence according to the flag. For example, when a value of the flag is 1, it indicates that the image content of the current sequence is a first image content. When the value of the flag is 0, it indicates that the image content of the current sequence is a second image content. The first image content is different from the second image content.

In some embodiments, the video encoder signals the first flag into the bitstream, where the first flag indicates whether a first technology is used, and the first technology is used for a first image content.

In some embodiments of the present disclosure, it may be understood that the weighted blending condition may change only when the image content of the current block is the first image content, and the weighted blending condition does not change when the image content of the current block is not the first image content. That is to say, if the image content of the current block is the first image content, the weighted blending condition to be used is the first blending condition, and if the image content of the current block is not the first image content, the weighted blending condition to be used is the second blending condition. The first blending condition is different from the second blending condition. The first blending condition is determined according to the amplitude values of the first intra prediction mode and the second intra prediction mode. For examples, the first blending condition is determined as that: a ratio of the first amplitude value of the first intra prediction mode to the second amplitude value of the second intra prediction mode is less than or equal to a first preset threshold.

Based on this, in order to improve the efficiency of determining the weighted blending condition for the current block by the video decoder, if the video encoder determines that the image content corresponding to the current block is the first image content, the video encoder determines that the first technology can be used for the current block. The first technology can be understood as a technology provided in embodiments of the present disclosure, that is, the weighted blending condition for the current block is determined according to the amplitude values of the first intra prediction mode and the second intra prediction mode. If the video encoder determines that the first technology can be used for the current block, the video encoder sets the first flag as true and then signals the first flag into the bitstream, for example, a value of the first flag is 1. If the video encoder determines that the image content corresponding to the current block is not the first image content, the video encoder determines that the first technology cannot be used for the current block, and the video encoder sets the first flag as false and then signals the first flag into the bitstream, for example, the value of the first flag is 0. In this way, the video decoder decodes the bitstream to obtain the first flag, and then determines the weighted blending condition for the current block according to the first flag. For example, if the value of the first flag is 1, the weighted blending condition for the current block is determined according to the amplitude values of the first intra prediction mode and the second intra prediction mode. If the value of the first flag is 0, the weighted blending condition for the current block is determined according to another manner.

Optionally, the first flag may be a sequence-level flag, which indicates whether the first technology can be used for the current sequence.

Optionally, the first flag may be a picture-level flag, which indicates whether the first technology can be used for a current picture.

Optionally, a new field is added to the bitstream to represent the first flag. For example, a field sps_DIMD_blendoff_flag is used to represent the first flag, and the field is an entirely new field.

Optionally, the first flag is reused with a third flag of the current sequence, that is, an existing field in the current sequence can be reused without adding a new field, thereby saving codewords. For example, the third flag is an intra-block copy (IBC) enable flag or a template matching prediction (TMP) enable flag, etc.

S603, an intermediate prediction value of the current block is determined according to the weighted blending condition and at least one of the first intra prediction mode, the second intra prediction mode, or the third intra prediction mode.

According to the above method, after the weighted blending condition for the current block is determined, whether or not to perform weighted blending prediction on the current block is determined based on the weighted blending condition. For example, if the first intra prediction mode and the second intra prediction mode satisfy the weighted blending condition for the current block, the weighted blending prediction is performed on the current block by using the first intra prediction mode, the second intra prediction mode, and the third intra prediction mode. If the first intra prediction mode and the second intra prediction mode do not satisfy the weighted blending condition for the current block, the weighted blending prediction is performed on the current block by using the first intra prediction mode and/or the second intra prediction mode.

The present disclosure does not limit the specific type of the third intra prediction mode.

In one example, the third intra prediction mode is an intra prediction mode with the third greatest amplitude value in the histogram described above.

In one example, the third intra prediction mode is the Planar mode or the DC mode.

In the present disclosure, the manner of determining the intermediate prediction value of the current block according to the weighted blending condition and at least one of the first intra prediction mode, the second intra prediction mode, or the third intra prediction mode at S603 includes but is not limited to the following.

Manner 1, when the weighted blending condition for the current block is that the ratio of the first amplitude value of the first intra prediction mode to the second amplitude value of the second intra prediction mode is less than or equal to the first preset threshold, then the operations at S603 further include operations at S603-A1 as follows.

S603-A1, if the ratio of the first amplitude value to the second amplitude value is greater than the first preset threshold, the first intra prediction mode is used to determine the target prediction value for the current block.

In embodiments of the present disclosure, when the first intra prediction mode and the second intra prediction mode do not satisfy the above-determined weighted blending condition for the current block, it indicates that the first amplitude value corresponding to the first intra prediction mode is much larger than the second amplitude value corresponding to the second intra prediction mode. In this case, a better prediction effect can be realized by using the first intra prediction mode for predicting the current block, and weighted prediction is not needed.

In some embodiments, the operations at S603 further include operations at S603-A2 as follows S603-A2, if the ratio of the first amplitude value to the second amplitude value is less than or equal to the first preset threshold, the intermediate prediction value for the current block is determined by using the first intra prediction mode, the second intra prediction mode, and the third intra prediction mode.

For example, the current block is predicted by using the first intra prediction mode, the second intra prediction mode, and the third intra prediction mode separately, to obtain respective prediction values. Then the prediction values corresponding to the respective intra prediction modes are weighted to obtain the target prediction value for the current block.

In some embodiments, the operations of determining the intermediate prediction value of the current block using the first intra prediction mode, the second intra prediction mode, and the third intra prediction mode at S603-A2 above include the following operations.

S603-A21, weights corresponding to the first intra prediction mode, the second intra prediction mode, and the third intra prediction mode respectively are determined.

The manner of determining the weights corresponding to the first intra prediction mode, the second intra prediction mode, and the third intra prediction mode respectively includes but is not limited to the following examples.

Example 1, the weights corresponding to the first intra prediction mode, the second intra prediction mode, and the third intra prediction mode respectively are each a preset weight.

Optionally, the three intra prediction modes correspond to the same weight, for example, each of the weights is ⅓.

Optionally, since the first intra prediction mode is the intra prediction mode with the greatest amplitude value among the N intra prediction modes, the weight corresponding to the first intra prediction mode may be larger than the weights of the other two prediction modes.

Example 2, the weight corresponding to the third intra prediction mode is determined as a preset weight, and the weights corresponding to the first intra prediction mode and the second intra prediction mode respectively are determined according to the first amplitude value and the second amplitude value.

Optionally, the weight corresponding to the third intra prediction mode is determined to be a, where the value of a is not limited in this disclosure, such as ⅓. Next, according to the first amplitude value and the second amplitude value, the weight corresponding to the first intra prediction mode and the weight corresponding to the second intra prediction mode are determined. For example, the weight corresponding to the first intra prediction mode is obtained by multiplying a ratio of the first amplitude value to a sum of the first amplitude value and the second amplitude value, by 1−a. Then the weight corresponding to the second intra prediction mode is obtained by multiplying a ratio of the second amplitude value to the sum of the first amplitude value and the second amplitude value, by 1−a.

S603-A22, prediction values of the current block are determined by using the first intra prediction mode, the second intra prediction mode, and the third intra prediction mode respectively to predict the current block.

Specifically, a first prediction value is obtained by predicting the current block using the first intra prediction mode, a second prediction value is obtained by predicting the current block using the second intra prediction mode, and a third prediction value is obtained by predicting the current block using the third intra prediction mode.

S603-A23, the intermediate prediction value of the current block is obtained by weighting the prediction values with the weights corresponding to the first intra prediction mode, the second intra prediction mode, and the third intra prediction mode, respectively.

For example, the prediction values corresponding to the respective intra prediction modes are multiplied with the respective weights, the results of which are then summed to obtain the intermediate prediction value of the current block. Exemplarily, the prediction values corresponding to the first intra prediction mode, the second intra prediction mode, and the third intra prediction mode, respectively, may be weighted according to the above formula (2) to obtain the intermediate prediction value of the current block.

According to the above method, the intermediate prediction value of the current block can be determined according to the first intra prediction mode and/or the second intra prediction mode. Next, operations at S604 are performed.

S604, a target prediction value of the current block is determined according to the intermediate prediction value.

In some embodiments, the intermediate prediction value of the current block may be directly determined as the target prediction value of the current block.

In some embodiments, a cost corresponding to the intermediate prediction value needs to be compared with costs corresponding to prediction values under other prediction modes, and the target prediction value of the current block is determined according to the costs. Specifically, operations at S604 include the following.

S604-A1, first encoding cost corresponding to the intermediate prediction value is determined according to the intermediate prediction value.

The first encoding cost may be a RDO cost. Optionally, the first encoding cost may be an approximate cost such as SAD or SATD, which is not limited herein.

S604-A2, second encoding costs when predicting the current block using intra prediction modes respectively in a candidate prediction set are determined.

The candidate prediction set includes at least one intra prediction mode. The intra prediction modes in the candidate prediction set are traversed, and the second encoding costs corresponding to the respective intra prediction modes in the candidate prediction set are obtained by performing predictive coding on the current block using the intra prediction modes respectively.

S604-A3, the target prediction value of the current block is determined as a prediction value corresponding to a lowest encoding cost among the first encoding cost and the second encoding costs.

In some embodiments, when the first encoding cost is the lowest encoding cost among the first encoding cost and the second encoding costs, the above intermediate prediction value is determined as the target prediction value of the current block. In this case, the second flag is set as true and then is signalled into a bitstream. For example, the DIMD enable flag is set as true, for example, set as 1, and then is signalled into the bitstream.

In some embodiments, when the first encoding cost is not the lowest encoding cost among the first encoding cost and the second encoding costs, the second flag is set as false and then is signalled into the bitstream. For example, the DIMD enable flag is set as false, for example, set as 0, and then is signalled into the bitstream. The second flag indicates whether the target prediction value of the current block is determined according to at least one of the first intra prediction mode or the second intra prediction mode.

In some embodiments, whether to use the method of embodiments of the present disclosure is limited by a type of a current frame where the current block is located. In other words, whether to execute the operations of determining the weighted blending condition for the current block according to the amplitude values of the first intra prediction mode and the second intra prediction mode at S602, is determined according to the type of the current frame. It is specified in this embodiment that the method of embodiments of the present disclosure can be used for some types of frames and cannot be used for other types of frames, so that differentiated execution can be realized. For example, when the type of the current frame is a target frame-type, the weighted blending condition for the current block is determined according to the amplitude values of the first intra prediction mode and the second intra prediction mode. For example, the technical solution of the present disclosure is allowed for an I frame and is not allowed for a B frame. The present disclosure does not limit the target frame-type, which can be determined according to actual needs. Optionally, the target frame-type includes at least one of an I frame, a P frame, or a B frame.

In some embodiments, whether to use the method of embodiments of the present disclosure is limited by the type of a frame and the size of a picture block. In this case, before executing the method of embodiments of the present disclosure, the video encoder first determines the type of the current frame where the current block is located and the size of the current block, and then determines, according to the type of the current frame and the size of the current block, whether to determine the weighted blending condition for the current block according to the amplitude values of the first intra prediction mode and the second intra prediction mode.

It may be noted that in embodiments of the present disclosure, the size of the current block may include a height and a width of the current block. Therefore, the video decoder determines according to the height and the width of the current block whether to execute the operations at S602.

Exemplarily, in the present disclosure, when the type of the current frame is a first frame-type and the size of the current block is greater than a first threshold, the weighted blending condition for the current block is determined according to the amplitude values of the first intra prediction mode and the second intra prediction mode.

Exemplarily, in the present disclosure, when the type of the current frame is a second frame-type and the size of the current block is greater than a second threshold, the weighted blending condition for the current block is determined according to the amplitude values of the first intra prediction mode and the second intra prediction mode.

Optionally, the first frame-type is different from the second frame-type.

Optionally, the first threshold is also different from the second threshold.

The present disclosure does not limit specific types of the first frame-type and the second frame-type, and does not limit specific values of the first threshold and the second threshold.

In a specific example, if the first frame-type is the I frame and the second frame-type is the B frame or the P frame, the second threshold is different from the first threshold. That is, applicable block sizes specified for the I frame and the B frame (or the P frame) respectively may be different.

In some embodiments, whether to use the method of embodiments of the present disclosure may be further limited by a quantization parameter. In this case, before executing the method of embodiments of the present disclosure, the video encoder first obtains a quantization parameter corresponding to the current block. For example, the video encoder obtains the quantization parameter of the current block according to a frame-level allowed flag or a sequence-level QP allowed flag. Then, according to the quantization parameter, the video decoder determines whether to determine the weighted blending condition for the current block according to the amplitude values of the first intra prediction mode and the second intra prediction mode.

Exemplarily, when the quantization parameter is less than a third threshold, the weighted blending condition for the current block is determined according to the amplitude values of the first intra prediction mode and the second intra prediction mode. The present disclosure does not limit a specific value of the third threshold, which may be determined according to actual needs.

After the video encoder obtains the target prediction value of the current block according to the above method, the video encoder obtains a residual value of the current block according the target prediction value and an original value of the current block, performs transformation, quantization, and the like on the residual value, and then encodes to obtain the bitstream.

In the intra prediction method of embodiments of the present disclosure, the video encoder determines the amplitude values of N intra prediction modes corresponding to the reconstructed region adjacent to the current block, and determines the first intra prediction mode and the second intra prediction mode for the current block according to the amplitude values of the N intra prediction modes. Next, the video encoder determines the weighted blending condition for the current block the amplitude values of the first intra prediction mode and the second intra prediction mode. Then, the video encoder determines the intermediate prediction value of the current block according to the weighted blending condition and at least one of the first intra prediction mode, the second intra prediction mode, or a third intra prediction mode, and determines the target prediction value of the current block according to the intermediate prediction value. That is, in the present disclosure, the weighted blending condition for the current block is determined according to the amplitude values of the first intra prediction mode and the second intra prediction mode, and whether to perform weighted blending prediction on the current block is determined based on the weighted blending condition. In this way, the problem of lowering the prediction quality and introducing unexpected noise due to weighted blending prediction of image contents that do not need weighted blending prediction, can be avoided, and thus the accuracy of intra prediction can be improved.

An encoding process in which the intra prediction method provided in the present disclosure is combined with the DIMD technology will be introduced below.

Figure 11:
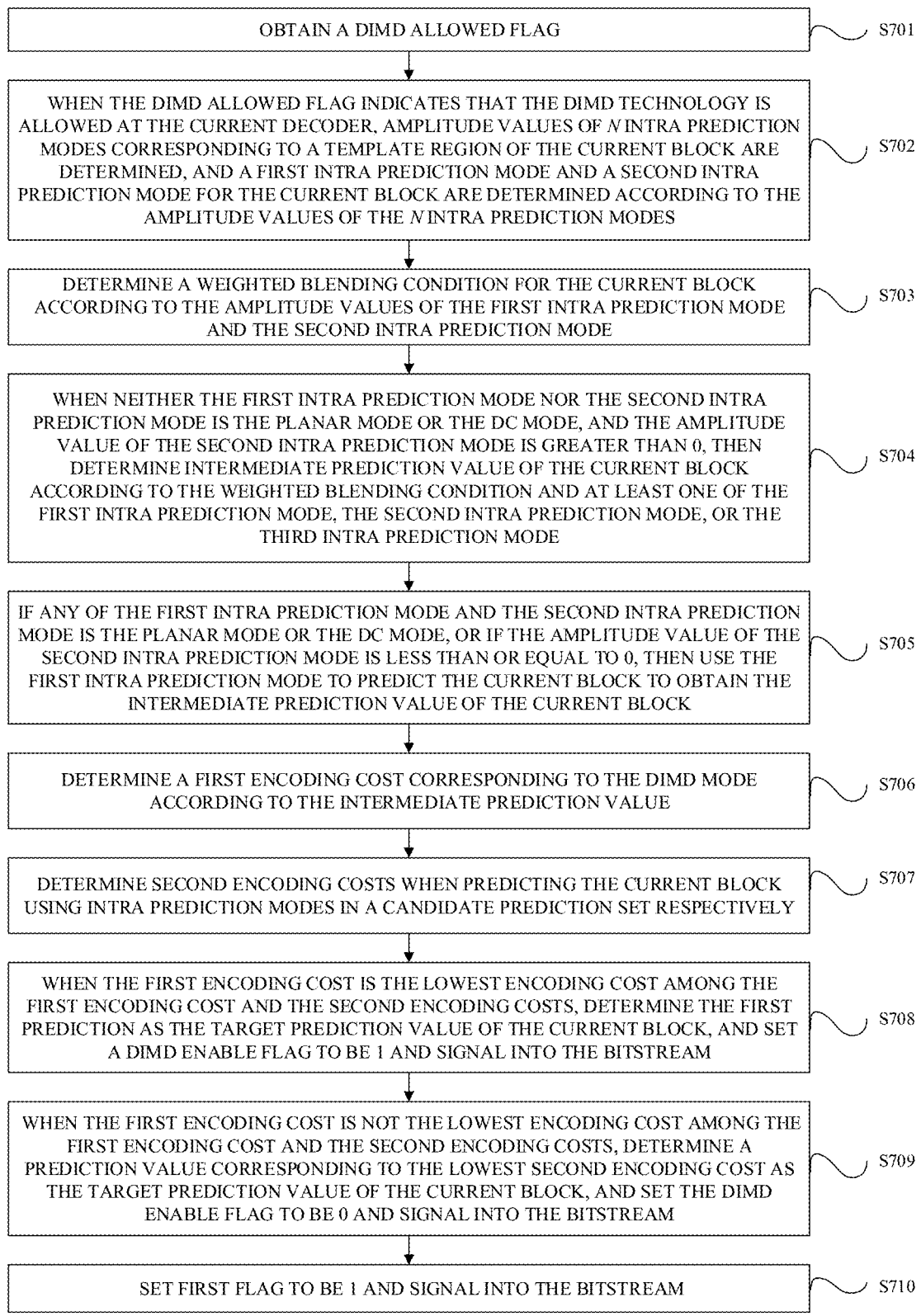
FIG. 11 is a schematic flowchart of an intra prediction method provided in embodiments of the present disclosure.

FIG. 11 is a schematic flowchart of an intra prediction method provided in embodiments of the present disclosure. As illustrated in FIG. 11, the intra prediction method includes the following.

S701, a DIMD allowed flag is obtained.

The DIMD allowed flag is used to indicate whether the DIMD technology is allowed at the current decoder.

S702, when the DIMD allowed flag indicates that the DIMD technology is allowed at the current decoder, amplitude values of N intra prediction modes corresponding to a template region of the current block are determined, and a first intra prediction mode and a second intra prediction mode for the current block are determined according to the amplitude values of the N intra prediction modes.

S703, a weighted blending condition for the current block is determined according to the amplitude values of the first intra prediction mode and the second intra prediction mode.

For example, a first blending condition is determined as that: a ratio of the first amplitude value of the first intra prediction mode to the second amplitude value of the second intra prediction mode is less than or equal to a first preset threshold.

S704, when neither the first intra prediction mode nor the second intra prediction mode is the Planar mode or the DC mode, and the amplitude value of the second intra prediction mode is greater than 0, then an intermediate prediction value of the current block is determined according to the weighted blending condition and at least one of the first intra prediction mode, the second intra prediction mode, or the third intra prediction mode.

For example, if the ratio of the first amplitude value to the second amplitude value is greater than the first preset threshold, the first intra prediction mode is used to determine the intermediate prediction value for the current block. Alternatively, if the ratio of the first amplitude value to the second amplitude value is greater than the first preset threshold, the first intra prediction mode and the second intra prediction mode are used to determine the intermediate prediction value for the current block.

For another example, if the ratio of the first amplitude value to the second amplitude value is less than or equal to the first preset threshold, the intermediate prediction value for the current block is determined using the first intra prediction mode, the second intra prediction mode, and the third intra prediction mode.

S705, if any of the first intra prediction mode and the second intra prediction mode is the Planar mode or the DC mode, or if the amplitude value of the second intra prediction mode is less than or equal to 0, then the first intra prediction mode is used to predict the current block to obtain the intermediate prediction value of the current block.

S706, a first encoding cost corresponding to the DIMD mode is determined according to the intermediate prediction value.

Optionally, the first encoding cost is a rate-distortion cost.

S707, second encoding costs when predicting the current block using intra prediction modes in a candidate prediction set respectively are determined.

S708, when the first encoding cost is the lowest encoding cost among the first encoding cost and the second encoding costs, the first prediction is determined as the target prediction value of the current block, and a DIMD enable flag is set to be 1 and signalled into the bitstream.

The DIMD enable flag indicates whether the DIMD technology is used for the current block.

S709, when the first encoding cost is not the lowest encoding cost among the first encoding cost and the second encoding costs, a prediction value corresponding to the lowest second encoding cost is determined as the target prediction value of the current block, and the DIMD enable flag is set to be 0 and signalled into the bitstream.

S701, a first flag is set to be 1 and signalled into the bitstream.

The first flag indicates whether a first technology is used, and the first technology is used for the first image content.

In embodiments of the present disclosure, by adjusting the weighted blending conditions in the DIMD technology, such as determining the weighted blending condition for the current block according to the amplitude values of the first intra prediction mode and the second intra prediction mode, the probability that the first intra prediction mode and the second intra prediction mode satisfy the weighted blending condition proposed in the present disclosure can be lowered, which can lower the probability of performing the weighted prediction on the current block of the first image content. Thereby, the prediction quality of the current block of the first image content can be ensured.

It may be understood that FIG. 8 to FIG. 11 are only examples of the present disclosure, which may not be construed as a limitation to the present disclosure.

The specific implementations of the present disclosure have been described in detail above in conjunction with the accompanying drawings. However, the present disclosure is not limited to the specific details in the above implementations. Within the scope of the technical concept of the present disclosure, various simple modifications may be made to the technical solutions of the present disclosure. These simple modifications all belong to the protection scope of the present disclosure. For example, the various specific technical features described in the above specific implementation manners can be combined in any suitable manner if there is no contradiction. To avoid unnecessary repetition, various possible combination manners are not further described in this disclosure. For another example, any combination of various implementations of the present disclosure can also be made, as long as they do not violate the idea of the present disclosure, which may also be regarded as the content disclosed in the present disclosure.

It may also be understood that in the various method embodiments of the present disclosure, the sequence numbers of the above-mentioned processes do not mean the order of execution, and the order of execution of the processes may be determined by their functions and internal logic, which shall not constitute any limitation to the implementation of embodiments of the present disclosure. In addition, in embodiments of the present disclosure, the term "and/or" is only an association relationship describing associated objects, indicating that there may be three relationships. Specifically, A and/or B may mean A exists alone, A and B exist simultaneously, and B exists alone. In addition, the character "/" in this article generally indicates that the contextual objects are an "or" relationship.

The method embodiments in the present disclosure are described in detail above with reference to FIG. 8 to FIG. 11. In the following, apparatus embodiments of the present disclosure will be described in detail with reference to FIG. 12 to FIG. 14.

Figure 12:
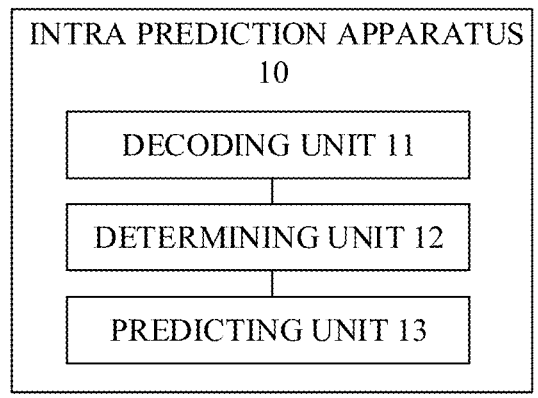
FIG. 12 is a schematic block diagram of an intra prediction apparatus provided in an embodiment of the present disclosure.

FIG. 12 is a schematic block diagram of an intra prediction apparatus provided in an embodiment of the present disclosure.

As illustrated in FIG. 12, the intra prediction apparatus 10 includes a decoding unit 11, a determining unit 12, and a predicting unit 13.

The decoding unit 11 is configured to decode a bitstream to determine amplitude values of N intra prediction modes corresponding to a reconstructed region adjacent to a current block, and determine a first intra prediction mode and a second intra prediction mode for the current block according to the amplitude values of the N intra prediction modes, where N is an integer greater than 1.

The determining unit 12 is configured to determine a weighted blending condition for the current block according to an amplitude value of the first intra prediction mode and an amplitude value of the second intra prediction mode, where the weighted blending condition is used to determine whether weighted prediction is performed on the current block based on the first intra prediction mode, the second intra prediction mode, and a third intra prediction mode.

The predicting unit 13 is configured to determine a target prediction value of the current block according to the weighted blending condition and at least one of the first intra prediction mode, the second intra prediction mode, or a third intra prediction mode.

In some embodiments, the determining unit 12 is specifically configured to determine, when an image content corresponding to the current block is a first image content, the weighted blending condition for the current block according to the amplitude value of the first intra prediction mode and the amplitude value of the second intra prediction mode.

In some embodiments, the determining unit 12 is specifically configured to decode the bitstream to obtain a first flag, where the first flag indicates whether a first technology is used, and the first technology is used for the first image content; and to determine, when the first flag indicates that the first technology is used, the weighted blending condition for the current block according to the amplitude value of the first intra prediction mode and the amplitude value of the second intra prediction mode.

In some embodiments, the determining unit 12 is specifically configured to determine the weighted blending condition for the current block as that a ratio of a first amplitude value of the first intra prediction mode to a second amplitude value of the second intra prediction mode is less than or equal to a first preset threshold.

In some embodiments, the predicting unit 13 is specifically configured to determine the target prediction value of the current block by using the first intra prediction mode, when the ratio of the first amplitude value to the second amplitude value is greater than the first preset threshold.

In some embodiments, the predicting unit 13 is specifically configured to determine the target prediction value of the current block by using the first intra prediction mode and the second intra prediction mode, when the ratio of the first amplitude value to the second amplitude value is greater than the first preset threshold.

In some embodiments, the predicting unit 13 is specifically configured to: obtain a first prediction value by predicting the current block using the first intra prediction mode; obtain a second prediction value by predicting the current block using the second intra prediction mode; determine a first weight of the first prediction value and a second weight of the second prediction value according to the first amplitude value and the second amplitude value; and determine the target prediction value of the current block according to the first prediction value, the second prediction value, the first weight, and the second weight.

In some embodiments, the predicting unit 13 is specifically configured to: determine a sum of the first amplitude value and the second amplitude value; determine a ratio of the first amplitude value to the sum as the first weight; and determine a ratio of the second amplitude value to the sum as the second weight.

In some embodiments, the predicting unit 13 is specifically configured to determine the target prediction value of the current block by using the first intra prediction mode, the second intra prediction mode, and the third intra prediction mode, when the ratio of the first amplitude value to the second amplitude value is less than or equal to the first preset threshold.

In some embodiments, the predicting unit 13 is specifically configured to: determine a weight corresponding to the first intra prediction mode, a weight corresponding to the second intra prediction mode, and a weight corresponding to the third intra prediction mode; determine a prediction value by predicting the current block using the first intra prediction mode, determine a prediction value by predicting the current block using the second intra prediction mode, and determine a prediction value by predicting the current block using the third intra prediction mode; and obtain the target prediction value of the current block by weighting the prediction value corresponding to the first intra prediction mode, the prediction value corresponding to the second intra prediction mode, and the prediction value corresponding to the third intra prediction mode using the weight corresponding to the first intra prediction mode, the weight corresponding to the second intra prediction mode, and the weight corresponding to the third intra prediction mode respectively.

Optionally, the weight corresponding to the first intra prediction mode, the weight corresponding to the second intra prediction mode, and the weight corresponding to the third intra prediction mode are each a preset weight.

In some embodiments, the predicting unit 13 is specifically configured to: determine the weight corresponding to the third intra prediction mode as a preset weight; and determine the weight corresponding to the first intra prediction mode and the weight corresponding to the second intra prediction mode according to the first amplitude value and the second amplitude value.

In some embodiments, the determining unit 12 is specifically configured to determine, when the first intra prediction mode and the second intra prediction mode satisfy a first preset condition, the weighted blending condition for the current block according to the amplitude value of the first intra prediction mode and the amplitude value of the second intra prediction mode.

In some embodiments, the predicting unit 13 is further configured to determine, when the first intra prediction mode and the second intra prediction mode do not satisfy the first preset condition, the target prediction value of the current block by using the first intra prediction mode.

In some embodiments, the first preset condition is that: neither the first intra prediction mode nor the second intra prediction mode is a Planar mode or a DC mode, and the second amplitude value of the second intra prediction mode is not zero.

In some embodiments, the decoding unit 11 is specifically configured to decode the bitstream to obtain a decoder-side intra mode derivation (DIMD) enable flag, the DIMD enable flag indicating whether a DIMD technology is used for the current block; and determine the amplitude values of the N intra prediction modes corresponding to the reconstructed region adjacent to the current block when the DIMD enable flag indicates that the DIMD technology is used for the current block.

In some embodiments, the decoding unit 11 is specifically configured to determine amplitude values of N intra prediction modes corresponding to a template region of the current block when the DIMD enable flag indicates that the DIMD technology is used for the current block.

In some embodiments, the decoding unit 11 is specifically configured to: determine an intra prediction mode with a greatest amplitude value among the N intra prediction modes as the first intra prediction mode; and determine an intra prediction mode with a second greatest amplitude value among the N intra prediction modes as the second intra prediction mode.

In some embodiments, the decoding unit 11 is specifically configured to: decode the bitstream to obtain a second flag, the second flag indicating whether the target prediction value of the current block is determined according to at least one of the first intra prediction mode, the second intra prediction mode, or the third intra prediction mode; and determine the amplitude values of the N intra prediction modes corresponding to the reconstructed region adjacent to the current block when the second flag is true.

Optionally, the second flag is a DIMD enabled flag.

In some embodiments, the decoding unit 11 is further configured to: determine a type of a current frame containing the current block; and determine the weighted blending condition for the current block according to the amplitude value of the first intra prediction mode and the amplitude value of the second intra prediction mode when the type of the current frame is a target frame-type, where the target frame-type includes at least one of I frame, P frame, or B frame.

In some embodiments, the decoding unit 11 is further configured to: determine a type of a current frame containing the current block and determine a size of the current block; determine the weighted blending condition for the current block according to the amplitude value of the first intra prediction mode and the amplitude value of the second intra prediction mode, when the type of the current frame is a first frame-type and the size of the current block is greater than a first threshold; and determine the weighted blending condition for the current block according to the amplitude value of the first intra prediction mode and the amplitude value of the second intra prediction mode, when the type of the current frame is a second frame-type and the size of the current block is greater than a second threshold.

In some embodiments, the decoding unit 11 is further configured to: determine a quantization parameter corresponding to the current block; and determine the weighted blending condition for the current block according to the amplitude value of the first intra prediction mode and the amplitude value of the second intra prediction mode when the quantization parameter is less than a third threshold.

Optionally, the first flag is reused with a third flag of the current sequence, and the third flag is an intra-block copy (IBC) enable flag or a template matching prediction (TMP) enable flag of a sequence level.

It may be understood that the apparatus embodiments and the method embodiments may correspond to each other, and similar descriptions may refer to the method embodiments. To avoid repetition, details are not repeated herein. Specifically, the apparatus 10 as illustrated in FIG. 12 can execute the intra prediction method in embodiments of the present disclosure, and the aforementioned and other operations and/or functions of each unit in the apparatus 10 are configured to implement related operations of the intra prediction method. For the sake of brevity, the corresponding processes are not repeated herein.

Figure 13:
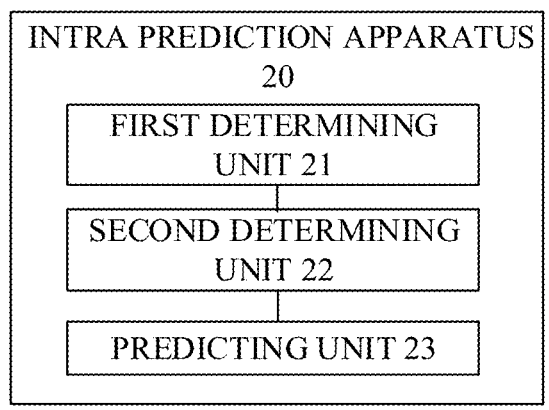
FIG. 13 is a schematic block diagram of an intra prediction apparatus provided in an embodiment of the present disclosure.

FIG. 13 is a schematic block diagram of an intra prediction apparatus provided in an embodiment of the present disclosure.

As illustrated in FIG. 13, the intra prediction apparatus 20 includes a first determining unit 21, a second determining unit 22, and a predicting unit 23.

The first determining unit 21 is configured to determine amplitude values of N intra prediction modes corresponding to a reconstructed region adjacent to a current block, and determine a first intra prediction mode and a second intra prediction mode for the current block according to the amplitude values of the N intra prediction modes, where N is an integer greater than 1.

The second determining unit 22 is configured to determine a weighted blending condition for the current block according to an amplitude value of the first intra prediction mode and an amplitude value of the second intra prediction mode, where the weighted blending condition is used to determine whether weighted prediction is performed on the current block based on the first intra prediction mode, the second intra prediction mode, and a third intra prediction mode.

The predicting unit 23 is configured to determine an intermediate prediction value of the current block according to the weighted blending condition and at least one of the first intra prediction mode, the second intra prediction mode, or a third intra prediction mode; and determine a target prediction value of the current block according to the intermediate prediction value of the current block.

In some embodiments, the first determining unit 21 is configured to determine, when an image content corresponding to the current block is a first image content, the weighted blending condition for the current block according to the amplitude value of the first intra prediction mode and the amplitude value of the second intra prediction mode.

In some embodiments, the predicting unit 23 is further configured to signal a first flag into a bitstream, where the first flag indicates whether a first technology is used, and the first technology is used for the first image content.

In some embodiments, the second determining unit 22 is specifically configured to determine the weighted blending condition for the current block as that a ratio of a first amplitude value of the first intra prediction mode to a second amplitude value of the second intra prediction mode is less than or equal to a first preset threshold.

In some embodiments, the predicting unit 23 is specifically configured to determine the intermediate prediction value of the current block by using the first intra prediction mode when the ratio of the first amplitude value to the second amplitude value is greater than the first preset threshold.

In some embodiments, the predicting unit 23 is specifically configured to determine the intermediate prediction value of the current block by using the first intra prediction mode and the second intra prediction mode when the ratio of the first amplitude value to the second amplitude value is greater than the first preset threshold.

In some embodiments, the predicting unit 23 is specifically configured to: determine a first prediction value by predicting the current block using the first intra prediction mode; determine a second prediction value by predicting the current block using the second intra prediction mode; determine a first weight of the first prediction value and a second weight of the second prediction value according to the first amplitude value and the second amplitude value; and determine the intermediate prediction value of the current block according to the first prediction value, the second prediction value, the first weight, and the second weight.

In some embodiments, the predicting unit 23 is specifically configured to: determine a sum of the first amplitude value and the second amplitude value; determine a ratio of the first amplitude value to the sum as the first weight; and determine a ratio of the second amplitude value to the sum as the second weight.

In some embodiments, the predicting unit 23 is specifically configured to determine the target prediction value of the current block by using the first intra prediction mode, the second intra prediction mode, and the third intra prediction mode when the ratio of the first amplitude value to the second amplitude value is less than or equal to the first preset threshold.

In some embodiments, the predicting unit 23 is specifically configured to: determine a weight corresponding to the first intra prediction mode, a weight corresponding to the second intra prediction mode, and a weight corresponding to the third intra prediction mode; determine a prediction value by predicting the current block using the first intra prediction mode, determine a prediction value by predicting the current block using the second intra prediction mode, and determine a prediction value by predicting the current block using the third intra prediction mode; and obtain the intermediate prediction value of the current block by weighting the prediction value corresponding to the first intra prediction mode, the prediction value corresponding to the second intra prediction mode, and the prediction value corresponding to the third intra prediction mode using the weight corresponding to the first intra prediction mode, the weight corresponding to the second intra prediction mode, and the weight corresponding to the third intra prediction mode respectively.

Optionally, the weight corresponding to the first intra prediction mode, the weight corresponding to the second intra prediction mode, and the weight corresponding to the third intra prediction mode are each a preset weight.

In some embodiments, the predicting unit 23 is specifically configured to determine the weight corresponding to the third intra prediction mode as a preset weight; and determine the weight corresponding to the first intra prediction mode and the weight corresponding to the second intra prediction mode according to the first amplitude value and the second amplitude value.

In some embodiments, the second determining unit 22 is specifically configured to determine the weighted blending condition for the current block according to the amplitude value of the first intra prediction mode and the amplitude value of the second intra prediction mode when the first intra prediction mode and the second intra prediction mode satisfy a first preset condition.

In some embodiments, the predicting unit 23 is specifically configured to determine the target prediction value of the current block by using the first intra prediction mode when the first intra prediction mode and the second intra prediction mode do not satisfy the first preset condition.

In some embodiments, the first preset condition is that: neither the first intra prediction mode nor the second intra prediction mode is a Planar mode or a DC mode, and the second amplitude value corresponding to the second intra prediction mode is not zero.

In some embodiments, the first determining unit 21 is specifically configured to obtain a decoder-side intra mode derivation (DIMD) allowed flag, the DIMD allowed flag indicating whether a DIMD technology is allowed for a current sequence; and determine the amplitude values of the N intra prediction modes when the DIMD allowed flag indicates that the DIMD technology is allowed for the current block.

In some embodiments, the first determining unit 21 is specifically configured to determine the amplitude values of the N intra prediction modes in a neighbouring reconstructed sample region of the current block when the DIMD allowed flag indicates that the DIMD technology is allowed for the current block.

In some embodiments, the second determining unit 22 is specifically configured to: determine an intra prediction mode with a greatest amplitude value among the N intra prediction modes as the first intra prediction mode; and determine an intra prediction mode with a second greatest amplitude value among the N intra prediction modes as the second intra prediction mode.

In some embodiments, the predicting unit 23 is specifically configured to: determine a first encoding cost corresponding to the intermediate prediction value according to the intermediate prediction value; determine second encoding costs when predicting the current block using intra prediction modes in a candidate prediction set respectively; and determine the target prediction value of the current block as a prediction value corresponding to a lowest encoding cost among the first encoding cost and the second encoding costs.

Optionally, the candidate prediction set includes other intra prediction modes in the N intra prediction modes than the first intra prediction mode and the second intra prediction mode.

In some embodiments, the predicting unit 23 is further configured to: setting a second flag as true and signalling the second flag into the bitstream, when the first encoding cost is the lowest encoding cost among the first encoding cost and the second encoding costs; and setting the second flag as false and signalling the second flag into the bitstream, when the first encoding cost is not the lowest encoding cost among the first encoding cost and the second encoding costs. The second flag indicates whether the target prediction value of the current block is determined according to at least one of the first intra prediction mode, the second intra prediction mode, or the third intra prediction mode.

Optionally, the second flag is a DIMD enabled flag.

In some embodiments, the second determining unit 22 is further configured to: determine a type of a current frame containing the current block; and determine the weighted blending condition for the current block according to the amplitude value of the first intra prediction mode and the amplitude value of the second intra prediction mode when the type of the current frame is a target frame-type, where the target frame-type includes at least one of I frame, P frame, or B frame.

In some embodiments, the second determining unit 22 is further configured to: determine a type of a current frame containing the current block and determining a size of the current block; determine the weighted blending condition for the current block according to the amplitude value of the first intra prediction mode and the amplitude value of the second intra prediction mode, when the type of the current frame is a first frame-type and the size of the current block is greater than a first threshold; and determine the weighted blending condition for the current block according to the amplitude value of the first intra prediction mode and the amplitude value of the second intra prediction mode, when the type of the current frame is a second frame-type and the size of the current block is greater than a second threshold.

In some embodiments, the second determining unit 22 is further configured to: determine a quantization parameter corresponding to the current block; and determine the weighted blending condition for the current block according to the amplitude value of the first intra prediction mode and the amplitude value of the second intra prediction mode when the quantization parameter is less than a third threshold.

Optionally, the first flag is reused with a third flag of the current sequence, and the third flag is an intra-block copy (IBC) enable flag or a template matching prediction (TMP) enable flag of a sequence level.

In some embodiments, the predicting unit 23 is further configured to signal the first flag into the bitstream.

It may be understood that the apparatus embodiments and the method embodiments may correspond to each other, and similar descriptions may refer to the method embodiments. To avoid repetition, details are not repeated herein. Specifically, the apparatus 20 as illustrated in FIG. 13 can execute the intra prediction method in embodiments of the present disclosure, and the aforementioned and other operations and/or functions of each unit in the apparatus 20 are configured to implement related operations of the encoding method. For the sake of brevity, the corresponding processes are not repeated herein.

The apparatus and system of the embodiments of the present disclosure are described above from the perspective of functional units with reference to the accompanying drawings. It may be understood that the functional units may be implemented in the form of hardware, may also be implemented by instructions in the form of software, and may also be implemented by a combination of hardware and software units. Specifically, each step of the method embodiments in the present disclosure can be completed by an integrated logic circuit of the hardware in the processor and/or instructions in the form of software, and the steps of the method disclosed in embodiments of the disclosure can be directly executed by a hardware coding processor or a combination of hardware and software units in the decoding processor. Optionally, the software unit may be located in a mature storage medium in the field such as random access memory, flash memory, read-only memory, programmable read-only memory, electrically erasable programmable memory, and registers. The storage medium is located in the memory, and the processor reads the information from the memory, and completes the steps in the above method embodiments in combination with its hardware.

Figure 14:
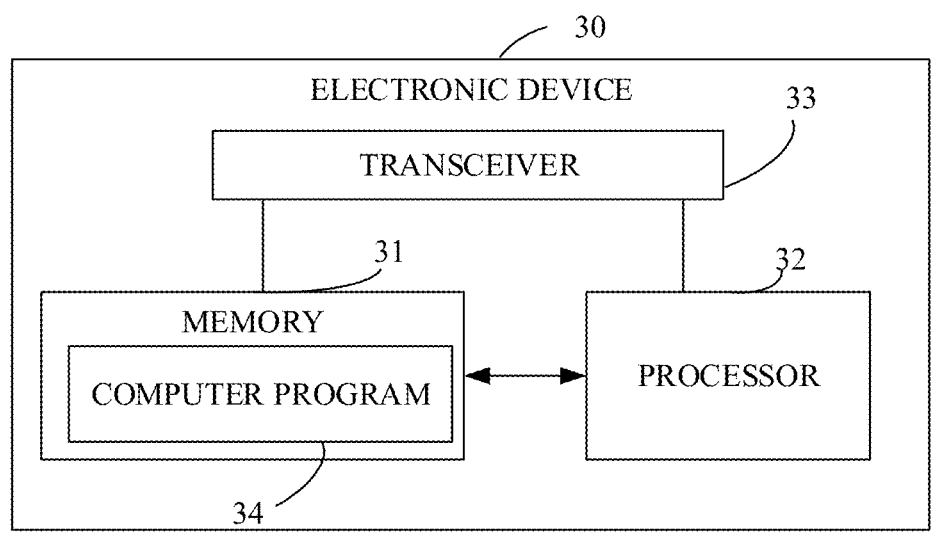
FIG. 14 is a schematic block diagram of an electronic device provided in embodiments of the present disclosure.

FIG. 14 is a schematic block diagram of an electronic device provided in embodiments of the present disclosure.

As illustrated in FIG. 14, the electronic device 30 may be the video encoder or video decoder described in embodiments of the present disclosure. The electronic device 30 may include a memory 31 and a processor 32. The memory 31 is configured to store a computer program 34 and transmit the program code 34 to the processor 32. In other words, the processor 32 can invoke and run the computer program 34 from the memory 31 to implement the method in embodiments of the present disclosure.

For example, the processor 32 can be configured to execute the steps in the above-mentioned method 200 according to the instructions in the computer program 34.

In some embodiments of the present disclosure, the processor 32 may include, but is not limited to: a general-purpose processor, digital signal processor (DSP), application specific integrated circuit (ASIC), field programmable gate array (FPGA), or other programmable logic devices, discrete gates or transistor logic devices, discrete hardware components, and so on.

In some embodiments of the present disclosure, the memory 31 includes but is not limited to: volatile memory and/or non-volatile memory. The non-volatile memory can be a read-only memory (ROM), programmable read-only memory (PROM), erasable programmable read-only memory (EPROM), electrically programmable erase programmable read-only memory (EEPROM), or flash. The volatile memory may be random access memory (RAM), which acts as an external cache. By way of illustration and not limitation, many forms of RAM are available such as static RAM (SRAM), dynamic RAM (DRAM), synchronous DRAM (SDRAM), double data rate synchronous dynamic random access memory (DDR SDRAM), enhanced synchronous dynamic random access memory (enhanced SDRAM, ESDRAM), synchronous connection dynamic random access memory (synch link DRAM, SLDRAM) and direct memory bus random access memory (direct Rambus RAM, DR RAM).

In some embodiments of the present disclosure, the computer program 34 can be divided into one or more units, and the one or more units are stored in the memory 31 and executed by the processor 32 to complete the methods in the present disclosure. The one or more units may be a series of computer program instruction segments capable of accomplishing specific functions, and the instruction segments are used to describe the execution process of the computer program 34 in the electronic device 30.

As illustrated in FIG. 14, the electronic device 30 may also include a transceiver 33, where the transceiver 33 may be connected to the processor 32 or the memory 31.

The processor 32 can control the transceiver 33 to communicate with other devices, specifically, to send information or data to other devices, or receive information or data sent by other devices. The transceiver 33 may include a transmitter and a receiver. The transceiver 33 may further include antennas, and the number of antennas may be one or more.

It may be understood that the various components in the electronic device 30 are connected through a bus system, where the bus system includes not only a data bus, but also a power bus, a control bus, and a status signal bus.

Figure 15:
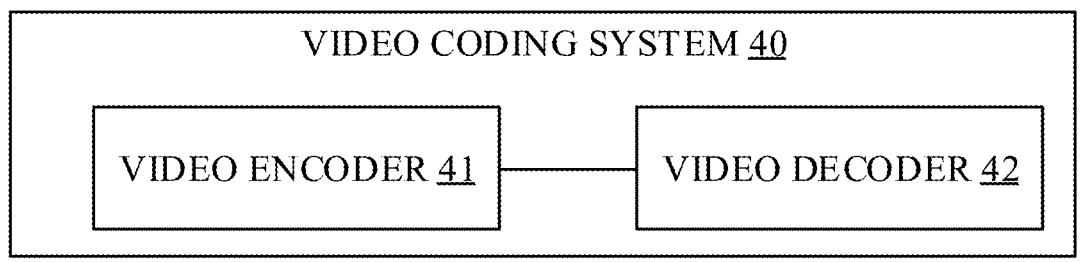
FIG. 15 is a schematic block diagram of a video coding system provided in embodiments of the present disclosure.

FIG. 15 is a schematic block diagram of a video coding system provided in embodiments of the present disclosure.

As illustrated in FIG. 15, the video coding system 40 may include a video encoder 41 and a video decoder 42, where the video encoder 41 is configured to execute the video encoding method involved in embodiments of the present disclosure, and the video decoder 42 is configured to execute the video decoding method involved in embodiments of the present disclosure.

The present disclosure further provides a computer storage medium, on which a computer program is stored, and when the computer program is executed by a computer, the computer can execute the methods of the above method embodiments. In other words, the embodiments of the present disclosure further provide a computer program product including instructions, and when the instructions are executed by a computer, the computer executes the methods of the foregoing method embodiments.

The present disclosure further provides a bitstream. The bitstream is generated according to the encoding method. Optionally, the bitstream may contain the first flag.

When implemented using software, the disclosure may be implemented in whole or in part in the form of a computer program product. The computer program product includes one or more computer instructions. When the computer program instructions are loaded and executed on the computer, the processes or functions according to the embodiments of the present disclosure will be generated in whole or in part. The computer can be a general-purpose computer, a special-purpose computer, a computer network, or other programmable devices. The computer instructions may be stored in or transmitted from one computer-readable storage medium to another computer-readable storage medium, for example, the computer instructions may be transferred from a website, computer, server, or data center by wire (such as coaxial cable, optical fiber, digital subscriber line (DSL)) or wireless (such as infrared, wireless, microwave, etc.) to another website site, computer, server or data center. The computer-readable storage medium may be any available medium that can be accessed by a computer, or a data storage device such as a server or a data center integrated with one or more available media. The available medium may be a magnetic medium (such as a floppy disk, a hard disk, or a magnetic tape), an optical medium (such as a digital video disc (DVD)), or a semiconductor medium (such as a solid state disk (SSD)), etc.

Those skilled in the art can appreciate that the units and algorithm steps of the examples described in conjunction with the embodiments disclosed herein can be implemented by electronic hardware, or a combination of computer software and electronic hardware. Whether these functions are executed by hardware or software depends on the specific disclosure and design constraints of the technical solution. Those skilled in the art may use different methods to implement the described functions for each specific disclosure, but such implementation may not be regarded as exceeding the scope of the present disclosure.

In the several embodiments provided in this disclosure, it may be understood that the disclosed systems, apparatuses, and methods may be implemented in other ways. For example, the apparatus embodiments described above are only illustrative. For example, the division of the units is only a logical function division. In actual implementation, there may be other division methods. For example, multiple units or components can be combined or can be integrated into another system, or some features may be ignored, or not implemented. In another point, the mutual coupling or direct coupling or communication connection illustrated or discussed may be through some interfaces, and the indirect coupling or communication connection of devices or units may be in electrical, mechanical, or other forms.

A unit described as a separate component may or may not be physically separated, and a component displayed as a unit may or may not be a physical unit, that is, it may be located in one place, or may be distributed to multiple network units. Part or all of the units can be selected according to actual needs to achieve the purpose of the solution of this implementation. For example, each functional unit in each embodiment of the present disclosure may be integrated into one processing unit, each unit may exist separately physically, or two or more units may be integrated into one unit.

The above is only a specific implementation of the disclosure, but the scope of protection of the disclosure is not limited thereto. Those skilled in the art can easily think of changes or substitutions within the technical scope disclosed in the disclosure, which may be covered within the scope of protection of this disclosure. Therefore, the protection scope of the present disclosure may be based on the protection scope of the claims.

What is claimed is:

1. An intra prediction method, comprising:
decoding a bitstream to determine amplitude values of N intra prediction modes corresponding to a reconstructed region adjacent to a current block, and determining a first intra prediction mode and a second intra prediction mode for the current block according to the amplitude values of the N intra prediction modes, N being an integer greater than 1;
determining a weighted blending condition for the current block according to an amplitude value of the first intra prediction mode and an amplitude value of the second intra prediction mode, wherein the weighted blending condition is used to determine whether weighted prediction is performed on the current block based on the first intra prediction mode, the second intra prediction mode, and a third intra prediction mode; and
determining a target prediction value of the current block according to the weighted blending condition and at least one of the first intra prediction mode, the second intra prediction mode, or a third intra prediction mode.

2. The method of claim 1, wherein determining the weighted blending condition for the current block according to the amplitude value of the first intra prediction mode and the amplitude value of the second intra prediction mode comprises:

decoding the bitstream to obtain a first flag, wherein the first flag indicates whether a first technology is used, and the first technology is used for the first image content; and
    determining, when the first flag indicates that the first technology is used, the weighted blending condition for the current block according to the amplitude value of the first intra prediction mode and the amplitude value of the second intra prediction mode.

3. The method of claim 1, wherein determining the weighted blending condition for the current block according to the amplitude value of the first intra prediction mode and the amplitude value of the second intra prediction mode comprises:

determining the weighted blending condition for the current block as that a ratio of a first amplitude value of the first intra prediction mode to a second amplitude value of the second intra prediction mode is less than or equal to a first preset threshold.

4. The method of claim 3, wherein determining the target prediction value of the current block according to the weighted blending condition and at least one of the first intra prediction mode, the second intra prediction mode, or the third intra prediction mode comprises:

determining the target prediction value of the current block by using the first intra prediction mode, when the ratio of the first amplitude value to the second amplitude value is greater than the first preset threshold.

5. The method of claim 1, wherein determining the weighted blending condition for the current block according to the amplitude value of the first intra prediction mode and the amplitude value of the second intra prediction mode comprises:

determining, when the first intra prediction mode and the second intra prediction mode satisfy a first preset condition, the weighted blending condition for the current block according to the amplitude value of the first intra prediction mode and the amplitude value of the second intra prediction mode.

6. The method of claim 5, further comprising:

determining, when the first intra prediction mode and the second intra prediction mode do not satisfy the first preset condition, the target prediction value of the current block by using the first intra prediction mode.

7. The method of claim 5, wherein the first preset condition is that:

neither the first intra prediction mode nor the second intra prediction mode is a Planar mode or a DC mode, and the second amplitude value of the second intra prediction mode is not zero.

8. The method of claim 1, wherein determining the amplitude values of the N intra prediction modes corresponding to the reconstructed region adjacent to the current block comprises:

decoding the bitstream to obtain a decoder-side intra mode derivation (DIMD) enable flag, the DIMD enable flag indicating whether a DIMD technology is used for the current block; and
    determining the amplitude values of the N intra prediction modes corresponding to the reconstructed region adjacent to the current block when the DIMD enable flag indicates that the DIMD technology is used for the current block.

9. The method of claim 8, wherein determining the amplitude values of the N intra prediction modes corresponding to the reconstructed region adjacent to the current block when the DIMD enable flag indicates that the DIMD technology is used for the current block comprises:

determining amplitude values of N intra prediction modes corresponding to a template region of the current block when the DIMD enable flag indicates that the DIMD technology is used for the current block.

10. The method of claim 1, wherein determining the first intra prediction mode and the second intra prediction mode of the current block according to the amplitude values of the N intra prediction modes comprises:

determining an intra prediction mode with a greatest amplitude value among the N intra prediction modes as the first intra prediction mode; and
    determining an intra prediction mode with a second greatest amplitude value among the N intra prediction modes as the second intra prediction mode.

11. The method of claim 1, further comprising:

decoding the bitstream to obtain a second flag, the second flag indicating whether the target prediction value of the current block is determined according to at least one of the first intra prediction mode, the second intra prediction mode, or the third intra prediction mode; and
    determining the amplitude values of the N intra prediction modes corresponding to the reconstructed region adjacent to the current block when the second flag is true.

12. The method of claim 11, wherein the second flag is a decoder-side intra mode derivation (DIMD) enabled flag.

13. The method of claim 2, wherein the first flag is reused with a third flag of the current sequence, and the third flag is an intra-block copy (IBC) enable flag or a template matching prediction (TMP) enable flag of a sequence level.

14. The method of claim 1, wherein the third intra prediction mode is a Planar mode.

15. An intra prediction method, comprising:

determining amplitude values of N intra prediction modes corresponding to a reconstructed region adjacent to a current block, and determining a first intra prediction mode and a second intra prediction mode for the current block according to the amplitude values of the N intra prediction modes, N being an integer greater than 1;
    determining a weighted blending condition for the current block according to an amplitude value of the first intra prediction mode and an amplitude value of the second intra prediction mode, wherein the weighted blending condition is used to determine whether weighted prediction is performed on the current block based on the first intra prediction mode, the second intra prediction mode, and a third intra prediction mode;
    determining an intermediate prediction value of the current block according to the weighted blending condition and at least one of the first intra prediction mode, the second intra prediction mode, or a third intra prediction mode; and
    determining a target prediction value of the current block according to the intermediate prediction value of the current block.

16. The method of claim 15, wherein determining the weighted blending condition for the current block according to the amplitude value of the first intra prediction mode and the amplitude value of the second intra prediction mode comprises:

determining, when an image content corresponding to the current block is a first image content, the weighted blending condition for the current block according to the amplitude value of the first intra prediction mode and the amplitude value of the second intra prediction mode; and the method further comprises:
signalling a first flag into a bitstream, wherein the first flag indicates whether a first technology is used, and the first technology is used for the first image content.

17. The method of claim 15, wherein determining the weighted blending condition for the current block according to the amplitude value of the first intra prediction mode and the amplitude value of the second intra prediction mode comprises:
determining the weighted blending condition for the current block as that a ratio of a first amplitude value of the first intra prediction mode to a second amplitude value of the second intra prediction mode is less than or equal to a first preset threshold.

18. The method of claim 17, wherein determining the intermediate prediction value of the current block according to the weighted blending condition and at least one of the first intra prediction mode, the second intra prediction mode, or the third intra prediction mode comprises:
determining the intermediate prediction value of the current block by using the first intra prediction mode when the ratio of the first amplitude value to the second amplitude value is greater than the first preset threshold.

19. The method of claim 15, wherein determining the weighted blending condition for the current block according to the amplitude value of the first intra prediction mode and the amplitude value of the second intra prediction mode comprises:
determining the weighted blending condition for the current block according to the amplitude value of the first intra prediction mode and the amplitude value of the second intra prediction mode when the first intra prediction mode and the second intra prediction mode satisfy a first preset condition,
wherein the first preset condition is that:
neither the first intra prediction mode nor the second intra prediction mode is a Planar mode or a DC mode, and the second amplitude value corresponding to the second intra prediction mode is not zero.

20. A non-transitory computer-readable storage medium storing a bitstream and a computer program thereon, wherein when executed by a processor, the computer program causes the processor to decode the bitstream to generate a picture according to a decoding method, the decoding method comprising:
decoding the bitstream to determine amplitude values of N intra prediction modes corresponding to a reconstructed region adjacent to a current block, and determine a first intra prediction mode and a second intra prediction mode for the current block according to the amplitude values of the N intra prediction modes, N being an integer greater than 1;
determining a weighted blending condition for the current block according to an amplitude value of the first intra prediction mode and an amplitude value of the second intra prediction mode, wherein the weighted blending condition is used to determine whether weighted prediction is performed on the current block based on the first intra prediction mode, the second intra prediction mode, and a third intra prediction mode; and
determining a target prediction value of the current block according to the weighted blending condition and at least one of the first intra prediction mode, the second intra prediction mode, or a third intra prediction mode.

* * * * *